(12) United States Patent
Nagatsuka

(10) Patent No.: US 9,479,410 B2
(45) Date of Patent: Oct. 25, 2016

(54) INFORMATION PROCESSING SYSTEM, INFORMATION PROCESSING DEVICE, DATA TRANSFER DEVICE, AND INFORMATION PROCESSING SYSTEM CONTROL METHOD

(71) Applicant: FUJITSU LIMITED, Kawasaki-shi, Kanagawa (JP)

(72) Inventor: Masaaki Nagatsuka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 114 days.

(21) Appl. No.: 14/168,536

(22) Filed: Jan. 30, 2014

(65) Prior Publication Data
US 2014/0269343 A1    Sep. 18, 2014

(30) Foreign Application Priority Data
Mar. 18, 2013  (JP) ................................ 2013-055649

(51) Int. Cl.
H04L 12/26    (2006.01)
H04L 12/24    (2006.01)

(52) U.S. Cl.
CPC ......... *H04L 43/0829* (2013.01); *H04L 41/064* (2013.01)

(58) Field of Classification Search
CPC .................................. H04L 43/0829
USPC ........................................ 370/242
See application file for complete search history.

(56) References Cited

U.S. PATENT DOCUMENTS

| 2006/0013210 A1* | 1/2006 | Bordogna | H04L 45/00 370/389 |
| 2007/0189305 A1* | 8/2007 | Fujimoto | H04J 3/0632 370/395.42 |
| 2010/0054124 A1* | 3/2010 | Ishihara | H04L 12/5695 370/230 |

FOREIGN PATENT DOCUMENTS

| JP | 2001-94562 | 4/2001 |
| JP | 2003-163913 | 6/2003 |
| JP | 2007-208635 | 8/2007 |

* cited by examiner

*Primary Examiner* — Mohammad Anwar
*Assistant Examiner* — Kokou R Detse
(74) *Attorney, Agent, or Firm* — Staas & Halsey LLP

(57) ABSTRACT

A processing system includes a first processing device and a switch device. The first processing device includes a first transmitter configured to transmit a plurality of packets, and a controller configured to acquire first time information indicating a first time at which the transmitting of the plurality of packets started. The switch device includes a first receiver configured to receive at least one of the plurality of packets transmitted from the first processing device and receive the first time information from the first processing device, a second transmitter configured to acquire second time information indicating a second time at which a link-up occurred, compare the second time information with the first time information, and perform a notification to a second processing device of occurrence of error in transmitting of the plurality of packets when the second time is later than the first time.

14 Claims, 17 Drawing Sheets

INFORMATION PROCESSING SYSTEM, INFORMATION PROCESSING DEVICE, DATA TRANSFER DEVICE, AND INFORMATION PROCESSING SYSTEM CONTROL METHOD

CROSS-REFERENCE TO RELATED APPLICATION

This application is based upon and claims the benefit of priority of the prior Japanese Patent Application No. 2013-055649 filed on Mar. 18, 2013, the entire contents of which are incorporated herein by reference.

FIELD

The embodiments discussed herein are related to an information processing system, an information processing device, a data transfer device, and a method for controlling the information processing system.

BACKGROUND

In general, in an information processing system having a plurality of information processing devices through a network that transfers data, when data transfer is requested from higher-level software, such as application software executed on each information processing device, the requested data is divided into a plurality of packets and transferred.

Then, in transfer of data divided into a plurality of packets, if the last packet reaches the destination node, the destination node will recognize that transfer of the data has been completed, from additional information included in the last packet. Thereafter, the destination node notifies the higher-level software of completion of one data transfer.

Additionally, in large-scale information processing systems, notably parallel computers such as supercomputers, remote direct memory access (RDMA) is adopted in many cases. The RDMA refers to a function of directly transferring memory data at one compute node into a memory at another compute node by using two network controllers. Using RDMA makes it possible to achieve communication with high throughput and low latency. In particular, RDMA protocol communication utilizing Ethernet (registered trademark), which is a network used for transmission control protocol/Internet protocol (TCP/IP), has been becoming available in recent years. For this reason, an increasing number of systems have been adopting RDMA.

When RDMA is adopted, a scheme in which a packet is resent at the link level of a network is often used as the scheme of guaranteed delivery of packets. In this case, since the delivery of packets is guaranteed in the network area, there is no measure for detecting and retransmitting a packet that has been discarded because of a bit error and so on between nodes for transmitting and receiving packets, for example.

One of the exceptions of guaranteed delivery at the link level of a network is the case where a link-down has occurred through failure of the hardware. Generally, regarding a link-down that occurs through failure of hardware, a period of time taken until the normal operation is restored is not guaranteed. For this reason, when a link-down has occurred, an information processing system discards a packet that is going to pass through a point where the link-down has occurred, in order to inhibit the packet from staying in the network. Such a link-down error is detected as a hardware error of the network by a device monitor system disposed external to the information processing system.

By the way, there are some cases where a link-down occurs through temporary failure of hardware, and immediately thereafter a link-up is established, thereby enabling data transfer to be resumed. When such an event occurs in the first half or in the middle of data transfer that transfers a series of packets, there is a possibility that packets in the second half including the final packet of the series of packets are delivered to the destination node although packets in the first half or in the middle of the data transfer are discarded. In this case, upon receipt of the final packet, the destination node will notify higher-level software of completion of data transfer. This practically causes corruption of data in the data transfer. Then, if the subsequent processing proceeds, the change in the content of a file system will be committed, for example. As a result, there is no reversion, and there is a possibility that an operation mistake having an influence on processing that follows would be committed.

In order to inhibit such packet losses in data transfer, a sequence as mentioned below has been performed to date. In the sequence, first, once a link-down occurs, the link-down is caused to be maintained. Then, when the external device monitor system detects a link-down error, the information processing system notifies operation management software of the occurrence of the link-down error, so that all applications that may use a point where the link-down has occurred are terminated because of the error. Then, the information processing system causes a link-up to occur again for the link-down point through the device monitor system. Thereafter, the information processing system executes again applications that use the point where the link-down has occurred.

Additionally, as a communication technology using packets, there is a conventional technology that assigns sequence numbers to packets and detects a packet loss by finding the omission of a sequence number. Examples of documents of the related art include Japanese Laid-open Patent Publication No. 2007-208635.

SUMMARY

According to an aspect of the invention, a processing system includes a first processing device and a switch device. The first processing device includes a first transmitter configured to transmit a plurality of packets, and a controller configured to acquire first time information indicating a first time at which the transmitting of the plurality of packets started. The switch device includes a first receiver configured to receive at least one of the plurality of packets transmitted from the first processing device and receive the first time information from the first processing device, a second transmitter configured to acquire second time information indicating a second time at which a link-up occurred, compare the second time information with the first time information, and perform a notification to a second processing device of occurrence of error in transmitting of the plurality of packets when the second time is later than the first time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The technology that causes a link-up to occur after stopping all the applications, a device monitor system and operation management software, which originally operate independently of each other, are brought into close cooperation with each other. The configuration of the information processing system thus becomes complex.

Additionally, in the conventional technology using sequence numbers, regarding inter-node data transfers in supercomputers, cloud systems, and so on, very many nodes are used, and therefore the number of sequence numbers that are to be used becomes enormous and the context management becomes difficult. It is thus difficult to realize the technology.

Embodiments of an information processing system, an information processing device, a data transfer device, and a method for controlling the information processing system of the present disclosure will be explained in detail below with reference to the drawings. It is to be noted that the embodiments explained below are not intended to limit the information processing system, the information processing device, the data transfer device, and the method for controlling the information processing system of the present disclosure.

[First Embodiment]

Figure 1:
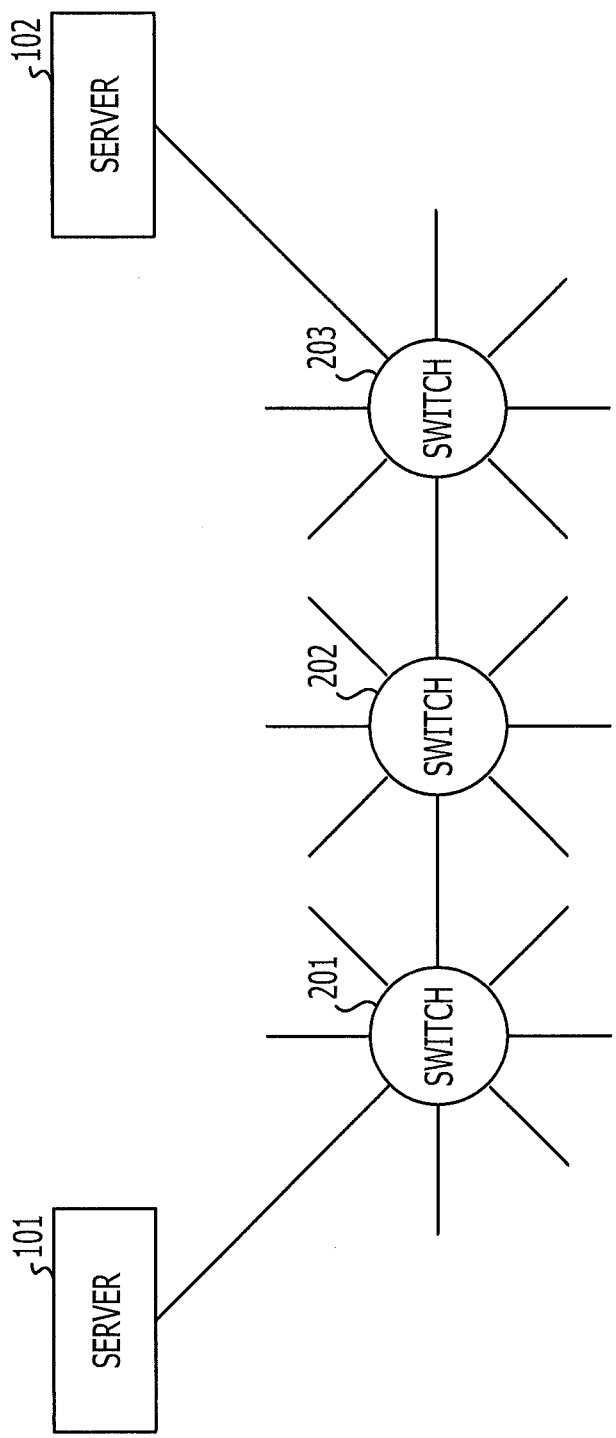
FIG. 1 is a system configuration diagram illustrating an example of an information processing system.

FIG. 1 is a system configuration diagram illustrating an example of an information processing system. As illustrated in FIG. 1, the information processing system according to this embodiment includes servers 101 and 102 and switches 201 to 203.

The server 101 and the server 102 are coupled to each other through the switches 201 to 203. A network that connects the server 101, the switches 201 to 203, and the server 102 is compliant with a protocol through which RDMA communication is carried out. For example, if the network interface cards of the servers 101 and 102, as well as the switches 201 to 203, adopt an RDMA technology adapted to a network used in communication for TCP/IP, Ethernet (registered trademark) may be used as a network connecting devices.

Here, in FIG. 1, two servers 101 and 102 and three switches 201 to 203 are illustrated for the sake of convenience. In the information processing system according to this embodiment, other servers and switches may be arranged. Additionally, other servers may be coupled to the switches 201 to 203. Furthermore, the number of the switches coupling the servers 101 and 102 does not have to be three as long as it is one or more.

Figure 2:
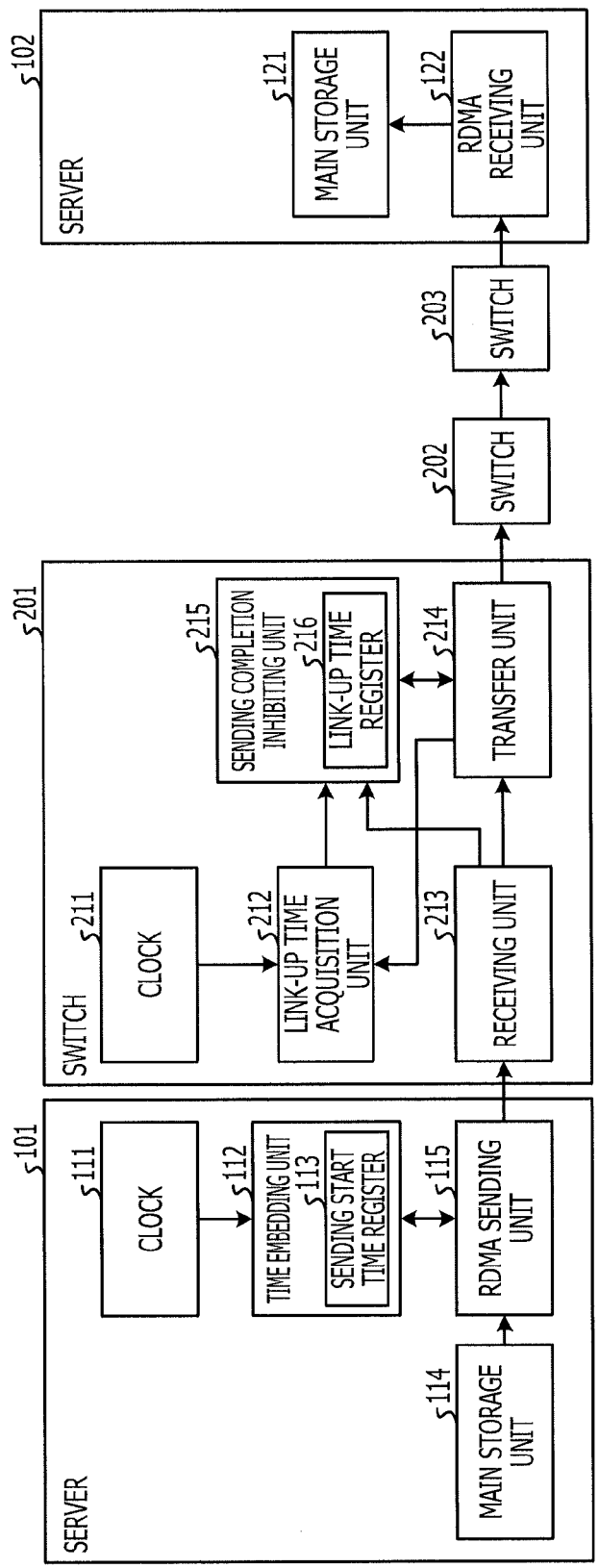
FIG. 2 is a block diagram of an information processing system according to a first embodiment.

FIG. 2 is a block diagram of the information processing system according to the first embodiment. Here, an example of the case where data transfer from the server 101 to the server 102 is performed using RDMA is given. Accordingly, in FIG. 2, only the functional blocks for transmitting data are illustrated in the server 101, and only the functional blocks for receiving data are illustrated in the server 102. In reality, however, both the server 101 and the server 102 are capable of transmitting and receiving data. Accordingly, the server 101 also has a function for receiving data, and the server 102 also has a function of transmitting data. All the switches 201 to 203 have the same configuration, and therefore the switch 201 will be taken as an example in the explanation given below. Accordingly, only the functional blocks of the switch 201 are illustrated in FIG. 2. However, the switches 202 and 203 have the same configuration as the switch 201.

The server 101 includes a clock 111, a time embedding unit 112, a main storage unit 114, and an RDMA transmitting unit 115.

The clock 111 is a clock that reports the current time.

The main storage unit 114 is a memory and so on. The server 101 executes an application, and the main storage unit 114 stores data such as a processing result obtained by execution of the application.

The RDMA transmitting unit 115 calculates division positions for dividing data stored in the main storage unit 114. Then, the RDMA transmitting unit 115 divides the data stored in the main storage unit 114 at the calculated division positions, and generates packets.

The RDMA transmitting unit 115 starts to transmit the generated packets to the main storage unit 121 of the server 102. Hereinafter, the first packet that the RDMA transmitting unit 115 transmits is referred to as a "start packet". Additionally, the last packet that the RDMA transmitting unit 115 transmits is referred to as a "final packet". Furthermore, packets between the start packet and the final packet transmitted by the RDMA transmitting unit 115 are referred to as "intermediate packets".

The RDMA transmitting unit 115 transmits the start packet to the switch 201. At this point, the RDMA transmitting unit 115 notifies the time embedding unit 112 of transmitting of the start packet. After the transmitting of the start packet, the RDMA transmitting unit 115 sequentially transmits intermediate packets. Then, the RDMA transmitting unit 115 transmits the final packet last. In the final packet, a time at which the start packet has been transmitted is embedded by the time embedding unit 112 described below.

The time embedding unit 112 has a transmitting start time register 113.

The time embedding unit 112 receives the notification of transmitting of the start packet from the RDMA transmitting unit 115. The time embedding unit 112 acquires a time at which the notification of transmitting of the start packet has been received, from the clock 111. Hereinafter, the time acquired by the time embedding unit 112 is referred to as a "transmitting start time". The time embedding unit 112 stores the transmitting start time in the transmitting start time register 113.

Then, the time embedding unit 112 checks the header of a packet generated by the RDMA transmitting unit 115, and determines whether the packet that the RDMA transmitting unit 115 is going to transmit is the final packet. If the packet that the RDMA transmitting unit 115 is going to transmit is the final packet, the time embedding unit 112 acquires the final packet from the RDMA transmitting unit 115 and embeds the transmitting start time, which has been stored in the transmitting start time register 113, in the header of the final packet. Then, the time embedding unit 112 transmits the final packet having the head in which the transmitting start time is embedded, to the RDMA transmitting unit 115.

Figure 3:
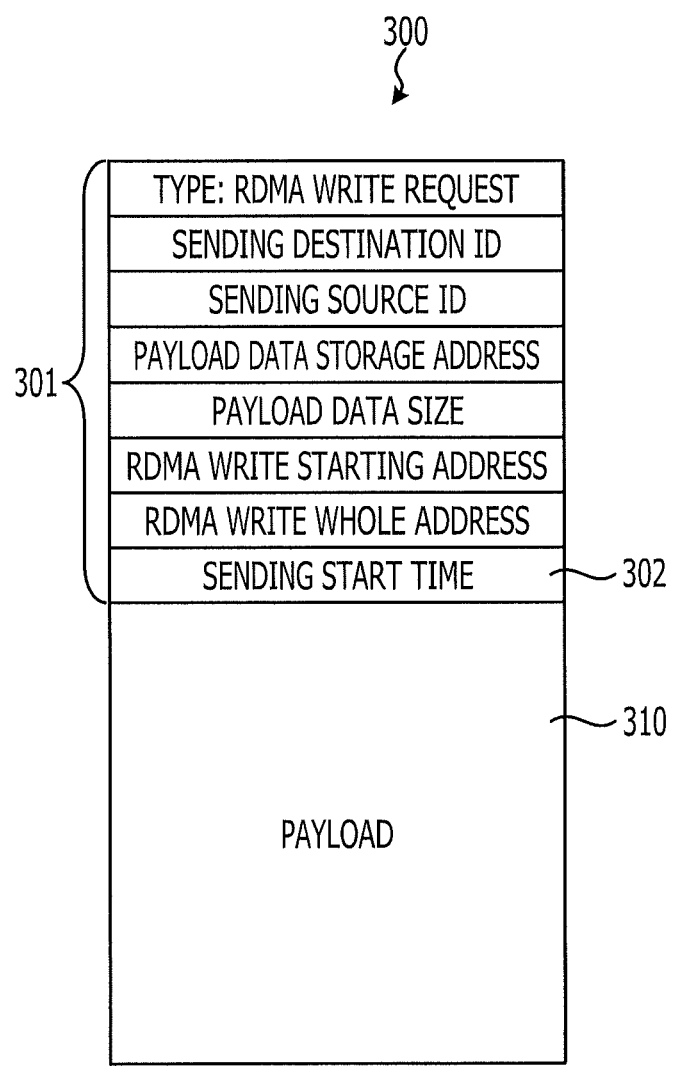
FIG. 3 illustrates an example of a final packet.

FIG. 3 illustrates an example of the final packet. As illustrated in FIG. 3, the final packet 300 has a header 301 and a payload 310. In the header 301, the identification information of the transmitting destination of data and the size of the payload 310 are stored. Particularly in the header 301 of the final packet 300, an RDMA write starting address and an RDMA write whole address are stored. In contrast to this, neither the RDMA write starting address nor the RDMA write whole address is stored in the headers of the start packet and intermediate packets. Additionally, a transmitting start time 302 is stored in the header 301 of the final packet 300. The payload 310 is the data obtained by dividing data stored in a memory.

Figure 4A:
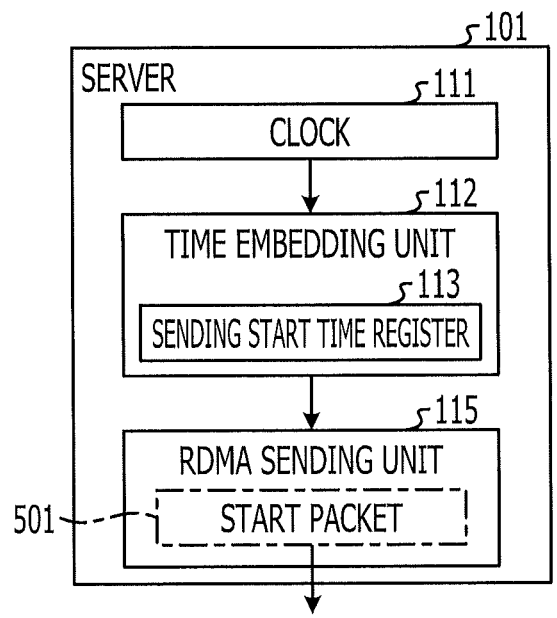
FIG. 4A is a block diagram for explaining operations of the server at the time of transmitting a start packet.
Figure 4B:
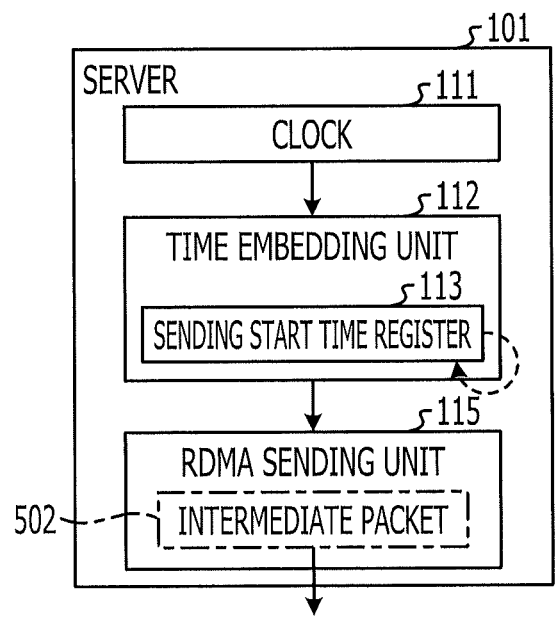
FIG. 4B is a block diagram for explaining operations of the server at the time of transmitting an intermediate packet.
Figure 4C:
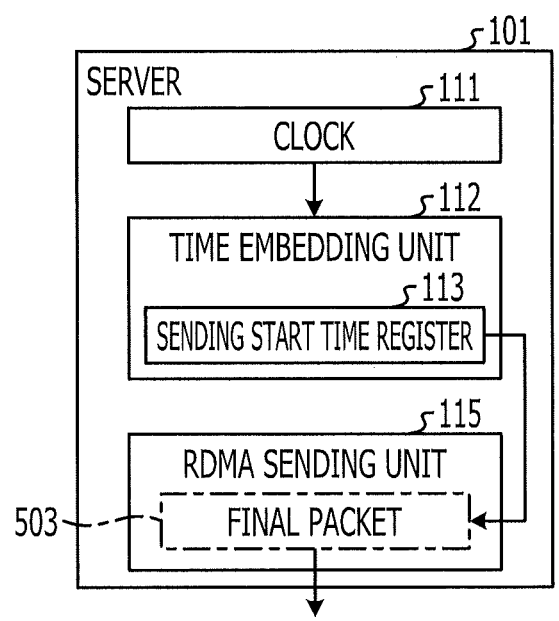
FIG. 4C is a block diagram for explaining operations of the server at the time of transmitting a final packet.

Furthermore, the operations of units of the server 101 when the server 101 transmits packets will be explained collectively with reference to FIG. 4A to FIG. 4C. FIG. 4A is a block diagram for explaining operations of the server at the time of transmitting the start packet. FIG. 4B is a block diagram for explaining operations of the server at the time of transmitting an intermediate packet. FIG. 4C is a block diagram for explaining operations of the server at the time of transmitting the final packet.

At the time of transmitting the start packet, as illustrated in FIG. 4A, the RDMA transmitting unit 115 generates a start packet 501. Then, the RDMA transmitting unit 115 transmits the generated start packet 501 to the switch 201. At this point, the RDMA transmitting unit 115 notifies the time embedding unit 112 of transmitting of the start packet 501.

The time embedding unit 112 receives the notification of transmitting of the start packet 501 from the RDMA transmitting unit 115. Then, the time embedding unit 112 acquires a time of receiving the notification of transmitting of the start packet 501, that is, a transmitting start time, from the clock 111. The time embedding unit 112 stores the acquired transmitting start time in the transmitting start time register 113 next.

At the time of transmitting an intermediate packet, as illustrated in FIG. 4B, the RDMA transmitting unit 115 generates an intermediate packet 502. The RDMA transmitting unit 115 then transmits the generated intermediate packet 502 to the switch 201. When the RDMA transmitting unit 115 has transmitted the intermediate packet 502, the time embedding unit 112 checks the header of the packet generated by the RDMA transmitting unit 115 so as to grasp that the transmitted packet is the intermediate packet 502. In the meantime, the time embedding unit 112 continues holding the transmitting start time in the transmitting start time register 113. The broken-line arrow exiting from and returning to the transmitting start time register 113 in FIG. 4B indicates that the transmitting start time register 113 is holding the transmitting start time.

At the time of transmitting the final packet, as illustrated in FIG. 4C, the RDMA transmitting unit 115 generates a final packet 503. At this point, the time embedding unit 112 checks the header of the packet created by the RDMA transmitting unit 115, and identifies the packet as the final packet 503. The time embedding unit 112 then embeds the transmitting start time stored in the transmitting start time register 113 in the final packet 503. Thereafter, the RDMA transmitting unit 115 transmits the final packet 503 to the switch 201.

In FIG. 2, the switch 201 includes a clock 211, a link-up time acquisition unit 212, a receiving unit 213, a transfer unit 214, and a transmitting completion inhibiting unit 215.

The receiving unit 213 sequentially receives the start packet, intermediate packets, and the final packet from the RDMA transmitting unit 115. The receiving unit 213 sequentially transmits the received start packet, intermediate packets, and final packet to the transfer unit 214. Additionally, the receiving unit 213 sequentially transmits the headers of the received start packet, intermediate packets, and final packet to the transmitting completion inhibiting unit 215.

The clock 211 is a clock that reports the current time. The clock 211 is synchronized with the clock 111, so that the time of the clock 211 is matched with the time of the clock 111. For example, in order to synchronize the clock 211 with the clock 111, there are a method in which synchronization is carried out by software using a network time protocol (NTP), a method in which synchronization is carried out by hardware using a dedicated synchronous protocol, and so forth.

The link-up time acquisition unit 212 monitors the coupling state between the switch 201 and the switch 202 by monitoring the output of packets of the transfer unit 214. For example, the link-up time acquisition unit 212 determines that a link-down has occurred, if packet output of the transfer unit 214 has been stopped for a predetermined period of time. Then, after determining that a link-down has occurred, the transfer unit 214 determines that a link-up has occurred if the packet output of the transfer unit 214 has started.

If the link-up time acquisition unit 212 determines that a link-up has occurred, then the link-up time acquisition unit 212 acquires a time from the clock 211. Hereinafter, the time acquired by the link-up time acquisition unit 212 is referred to as a "link-up time". Then, the link-up time acquisition unit 212 outputs the acquired link-up time to the transmitting completion inhibiting unit 215.

The transmitting completion inhibiting unit 215 has a link-up time register 216, which is a storage device. The transmitting completion inhibiting unit 215 receives a link-up time from the link-up time acquisition unit 212. Then, the transmitting completion inhibiting unit 215 stores the received link-up time in the link-up time register 216. If a link-up time is already stored in the link-up time register 216, the transmitting completion inhibiting unit 215 updates the link-up time stored in the link-up time register 216 by replacing it with a newly acquired link-up time. That is, the transmitting completion inhibiting unit 215 holds the latest link-up time in the link-up time register 216 at all times.

Additionally, the transmitting completion inhibiting unit 215 sequentially acquires the headers of the start packet, intermediate packets, and final packet from the receiving unit 213. Then, referring to a header, the transmitting completion inhibiting unit 215 determines whether a packet received by the receiving unit 213 and transmitted to the transfer unit 214 is the final packet. For example, depending on whether an RDMA write starting address and an RDMA write whole address are stored in a header, the transmitting completion inhibiting unit 215 determines whether a packet having the header is the final packet.

If the packet is the final packet, the transmitting completion inhibiting unit 215 compares a link-up time to be stored in the link-up time register 216 with the transmitting start time stored in the final packet. If the link-up time is later than the transmitting start time, the transmitting completion inhibiting unit 215 determines that a packet loss caused by the link-down has occurred. Then, the transmitting completion inhibiting unit 215 instructs the transfer unit 214 to discard the final packet.

The transfer unit 214 sequentially receives the start packet, intermediate packets, and the final packet from the receiving unit 213. Then, the transfer unit 214 sequentially outputs the received start packet and intermediate packets to the switch 202. Additionally, when the transfer unit 214 receives the final packet from the receiving unit 213, the transfer unit 214 checks whether there is an instruction from the transmitting completion inhibiting unit 215 requesting for discard of the final packet. If there is an instruction requesting for discard of the final packet, the transfer unit 214 discards the final packet and will not output the final packet to the switch 202. In contrast to this, if there is no instruction requesting for discard of the final packet, the transfer unit 214 outputs the final packet to the switch 202.

Figure 5A:
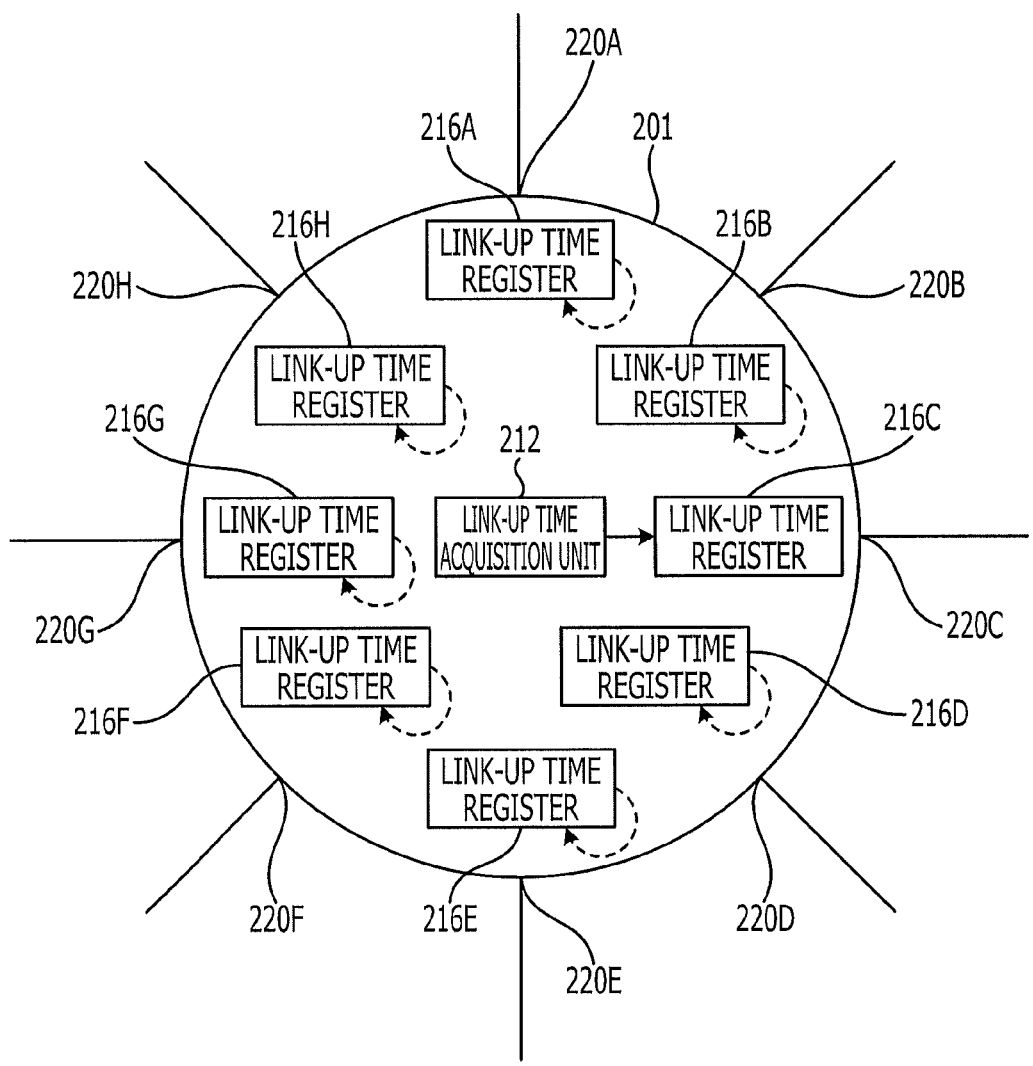
FIG. 5A is an illustration for explaining the operations of the switch upon occurrence of a link-up.
Figure 5B:
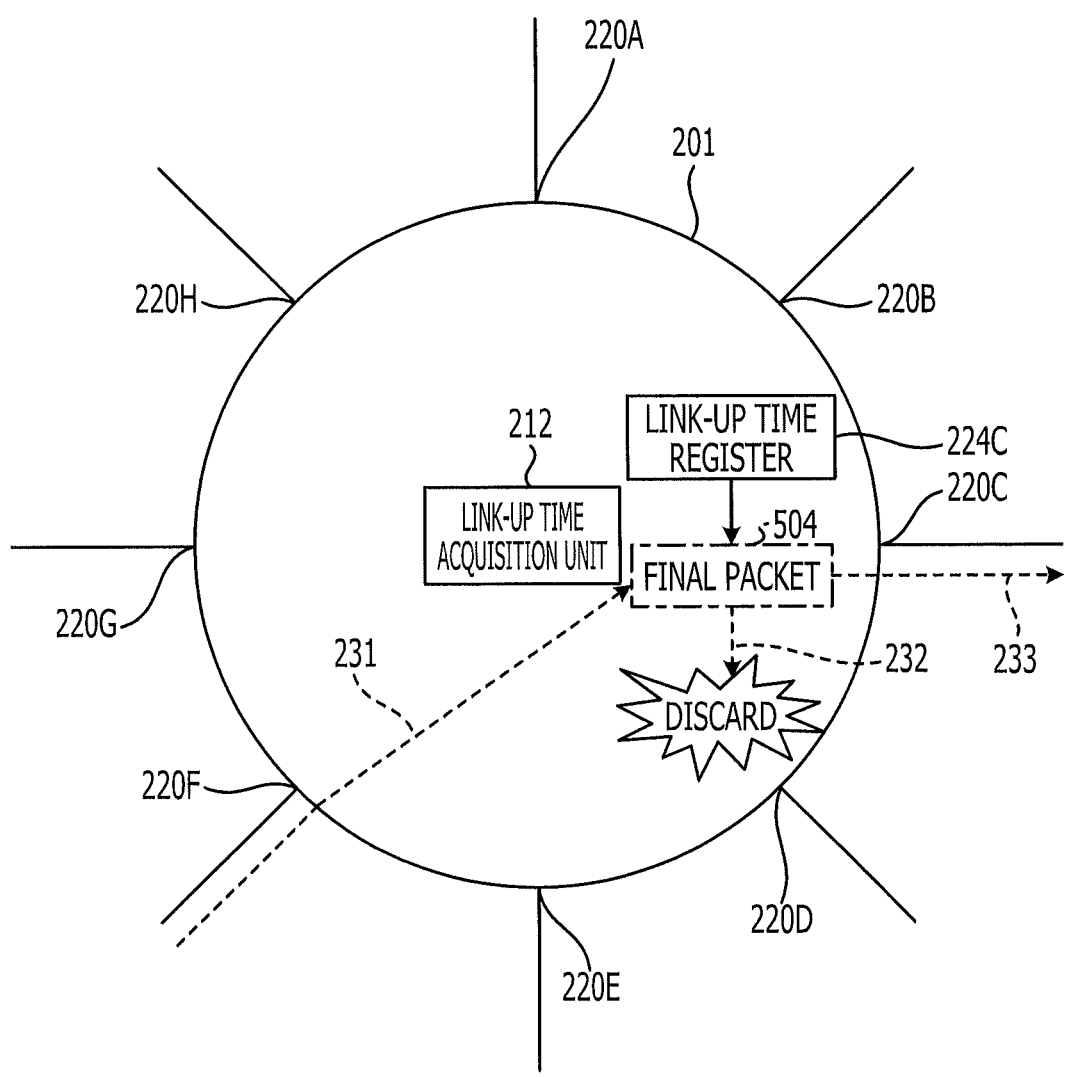
FIG. 5B is an illustration for explaining the operations of the switch at the time of transfer of a final packet.

Here, the operations of the switch 201 upon occurrence of a link-up and the operations at the time of transfer of the final packet will be explained collectively with reference to FIG. 5A and FIG. 5B. FIG. 5A is an illustration for explaining the operations of the switch upon occurrence of a link-up. FIG. 5B is an illustration for explaining the operations of the switch at the time of transfer of the final packet. The switch 201 according to this embodiment has eight ports as illustrated in FIG. 5A and FIG. 5B, for example. In FIG. 5A and FIG. 5B, ports of the switch 201 are presented as ports 220A to 220H. The port 220A to the port 220H have functions of receiving and transmitting packets, and have the functions of both of the receiving unit 213 and the transfer unit 214 in FIG. 2. Additionally, the link-up time registers that the ports 220A to 220H have are presented as link-up time registers 216A to 216H, respectively. Additionally, units illustrated in FIG. 1 that are unnecessary for explanation are omitted in FIG. 5A and FIG. 5B.

With reference to FIG. 5A and FIG. 5B, an explanation is given of the case where, in the coupling at the port 220C, a link-down has occurred and then a link-up has occurred, whereas a link-down has not occurred at the other ports 220A, 220B, and 220D to 220H. Upon occurrence of a link-up in the coupling at the port 220C, the time acquired by the link-up time acquisition unit 212 is stored in the link-up time register 216C. Since a link-down has not occurred at the ports 220A, 220B, and 220D to 220H, a link-up related to the link-down has also not occurred.

Accordingly, link-up times are held in the link-up time registers 216A, 216B, and 216D to 216H. Broken-line arrows at the link-up time registers 216A, 216B, and 216D to 216H in FIG. 5A indicate holding of link-up times.

Then, as indicated by a broken-line arrow 231 of FIG. 5B, a final packet 504 is input at the port 220F and is transferred to the port 220C so as to be output at the port 220C. At this point, the port 220C compares a transmitting start time embedded in the final packet 504 with a link-up time stored in the link-up time register 216C. If the link-up time is later than the transmitting start time, the port 220C discards the final packet 504 as indicated by a broken-line arrow 232. In contrast to this, if the link-up time is equal to or earlier than the transmitting start time, the port 220C outputs the final packet as indicated by a broken-line arrow 233.

The switch 202 sequentially receives the start packet and intermediate packets from the transfer unit 214 of the switch 201. Then, the switch 202 outputs the received start packet and intermediate packets to the switch 203. Additionally, if the final packet has not been discarded by the switch 201, the switch 202 receives the final packet from the switch 201. Then, the switch 202 compares the transmitting start time stored in the final packet with the link-up time as in the case of the switch 201, and discards the final packet if the link-up time is later than the transmitting start time. If the link-up time is not later than the transmitting start time, the switch 202 outputs the final packet to the switch 203.

The switch 203 sequentially receives the start packet and intermediate packets from the switch 202. Then, the switch 203 outputs the received start packet and intermediate packets to the server 102. Additionally, if the final packet has not been discarded by the switches 201 and 202, the switch 202 receives the final packet from the switch 202. Then, the switch 203 compares the transmitting start time stored in the final packet with the link-up time as in the case of the switch 202, and discards the final packet if the link-up time is later than the transmitting start time. If the link-up time is not later than the transmitting start time, the switch 203 outputs the final packet to the server 102.

The server 102 includes the main storage unit 121 and an RDMA receiving unit 122.

The main storage unit 121 is a memory and so on. The data stored in the main storage unit 121 is used for an application executed by the server 102, and so on.

The RDMA receiving unit 122 sequentially receives packets output from the switch 203. Then, the RDMA receiving unit 122 checks the headers of the received packets. If the final packet is received, the RDMA receiving unit 122 determines that communication has been completed.

Having determined that communication has been completed, the RDMA receiving unit 122 combines the received packets and reconstructs data. Thereafter, the RDMA receiving unit 122 stores the reconstructed data in the main storage unit 121.

On the other hand, if the RDMA receiving unit 122 has not been able to receive the final packet, the RDMA receiving unit 122 determines that communication has not been completed and transmitting of data results in failure.

In this way, when the final packet does not reach the RDMA receiving unit 122, the RDMA receiving unit 122 will not store data in the main storage unit 121. For this reason, if the final packet does not arrive, the server 102 does not perform processing using the data stored in the main storage unit 121 through an RDMA function. It is therefore possible to avoid performing processing using damaged data.

On the other hand, if the final packet arrives, the RDMA receiving unit 122 will determine that communication has been completed even if neither the start packet nor an intermediate packet has arrived, and will store data in the main storage unit 121. In this case, a broken data in which the start packet, an intermediate packet, and so on are lost is stored in the main storage unit 121. For this reason, the server 102 will perform processing using the broken data stored in the main storage unit 121, and wrong processing will be performed. In this regard, in the information processing system according to this embodiment, if the start packet, an intermediate packet, or the like is discarded because of a link-down, the final packet does not reach the server 102. Therefore, in the information processing system according to this embodiment, storage of broken data in the main storage unit 121 of the server 102 in the case where a link-down has occurred may be avoided.

Figure 6:
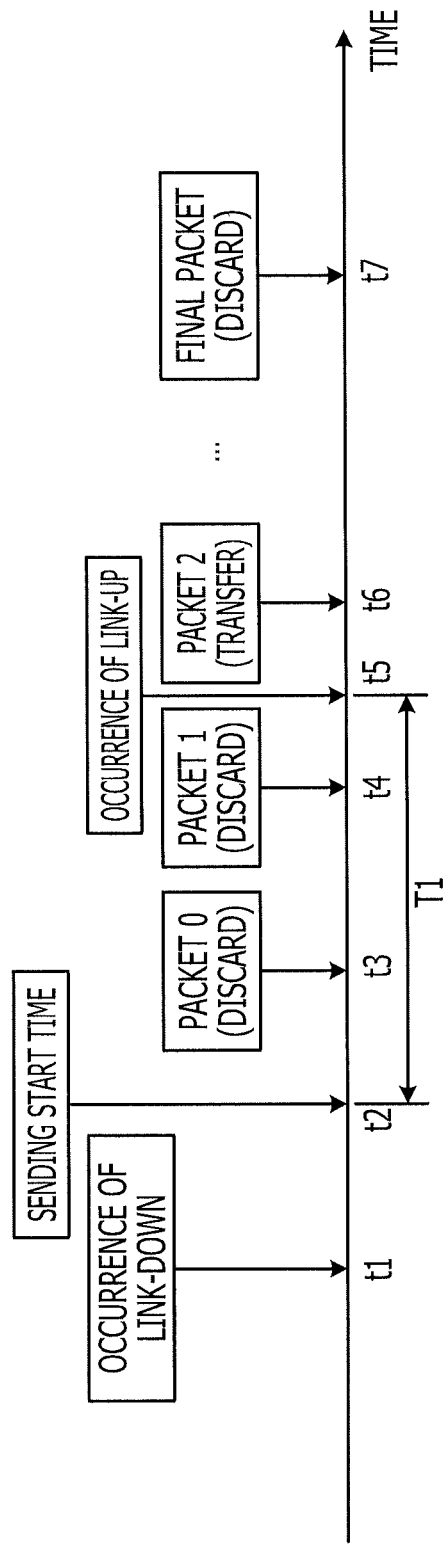
FIG. 6 is a diagram for explaining output of packets if a link-up has occurred during transfer of packets performed by a switch.
Figure 7:
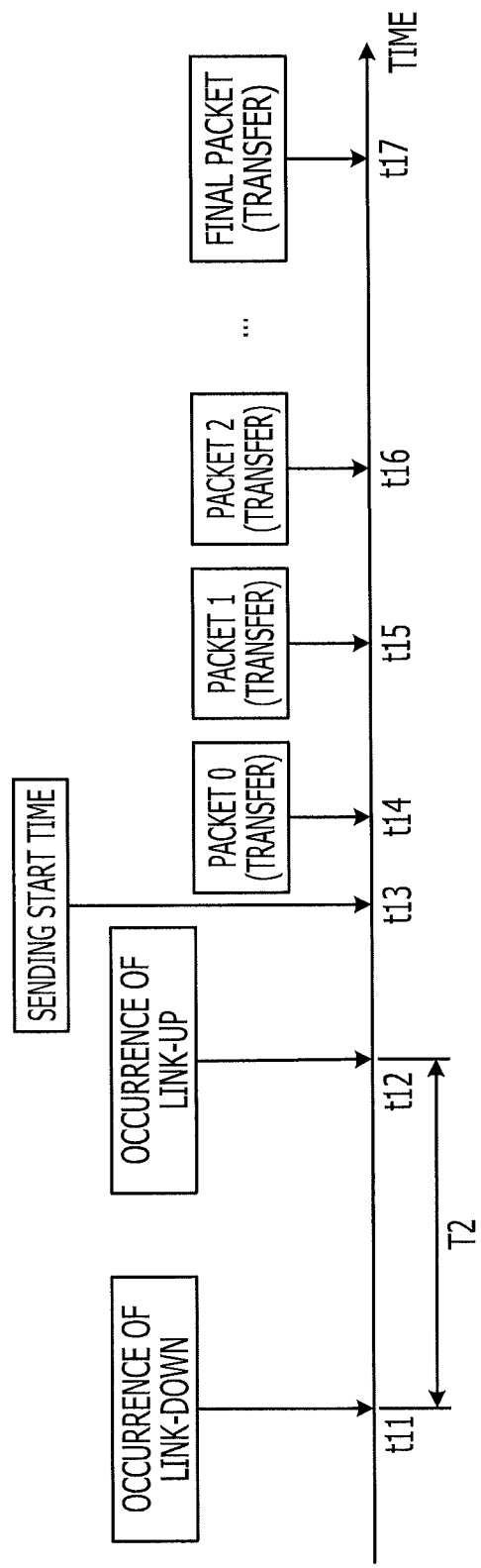
FIG. 7 is a diagram for explaining output of packets if a link-up has occurred before transfer of packets performed by the switch.
Figure 8:
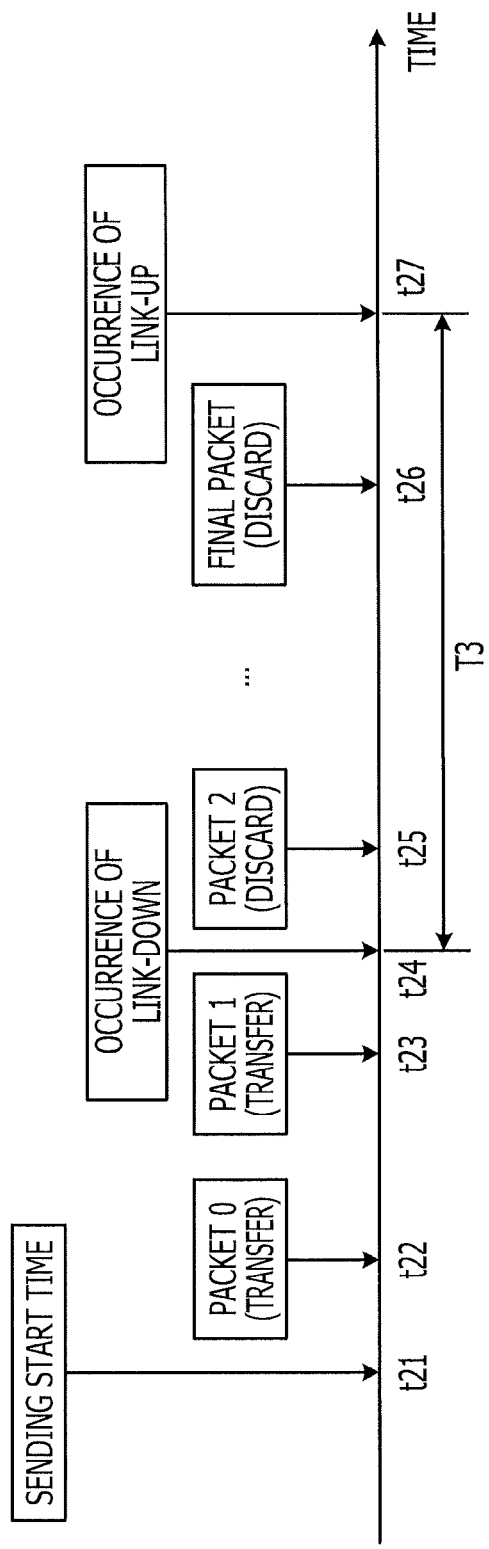
FIG. 8 is a diagram for explaining output of packets if a link-down has occurred during transfer of packets performed by the switch and a link-up has not occurred during the transfer of the plackets.

Here, with reference to FIG. 6 to FIG. 8, an explanation is given of output of packets performed by the switch 201 for each timing when a link-down has occurred. FIG. 6 is a diagram for explaining output of packets if a link-up has occurred during transfer of packets performed by a switch. FIG. 7 is a diagram for explaining output of packets if a link-up has occurred before transfer of packets performed by the switch. FIG. 8 is a diagram for explaining output of packets if a link-down has occurred during transfer of packets performed by the switch and a link-up has not occurred during the transfer of the plackets. In each of FIG. 6 to FIG. 8, the horizontal axis represents the lapse of time. That is, as the position on the horizontal axis advances rightward, the time at which the event indicated by the position has occurred becomes later. Hereinafter, the term "link-up" and the term "link-down" refer to a link-up and a link-down between the switch 201 and the switch 202. Additionally, among a series of packets generated by dividing data, the start packet is denoted by "0", and the subsequent packets are denoted by consecutive numbers in the order in which the packets are to be transferred. Additionally, an explanation will be given of the case where a link-down has not occurred in coupling other than the coupling between the switch 201 and the switch 202.

In FIG. 6, a link-down has occurred before the start of transmitting of packets, and thereafter a link-up occurs while the switch 201 is transferring packets. Specifically, a link-down occurs at a time t1. Thereafter, the server 101 transmits the start packet at a time t1. That is, the time t1 will be the transmitting start time to be embedded in the final packet. Thereafter, the switch 201 attempts to transfer a packet 0 and a packet 1 at times t3 and t4. However, it is impossible to transfer packets in a period of time T1 during which the link is down. Accordingly, the switch 201 discards the packet 0 and the packet 1. Thereafter, a link-up occurs at a time t5. Then, at and after the time t5, the switch 201 may transfer packets to the switch 202. For example, at a time t6, the switch 201 outputs a packet 2 to the switch 202. Thereafter, the switch 201 compares the time t2, which is the transmitting start time stored in the final packet, with the time t5, which is the link-up time. Then, since the time t5 is later than the time t2, the switch 201 discards the final packet at a time t7. In this case, since the packet 0, the packet 1, and the final packet are discarded and will not be transmitted to the switch 202, these packets are eventually not transmitted to the server 102. Accordingly, in the information processing system according to this embodiment, as illustrated in FIG. 6, if some of the packets other than the final packet have been discarded because of a link-down, the server 102 may determine that communication will not be completed and transmitting of data has failed. For this reason, the server 102 may avoid performing processing using faulty data.

On the other hand, as in a conventional way, when all the received packets are transferred if these packets may be transferred, without a comparison between the transmitting start time and the link-up time, the packet 0 and the packet 1 are not transmitted to the switch 202, but the final packet would be transmitted to the switch 202. Then, the final packet would reach the server 102. Accordingly, even if some of the packets other than the final packet are discarded because of a link-down, the server 102 would determine that communication has been completed. For this reason, the server 102 would perform processing using faulty data.

Here, the case where some packets including the start packet are discarded has been explained with reference to FIG. 6. Also in the case where some intermediate packets are discarded, with the information processing device according to this embodiment, the final packet is discarded and does not reach the server 102. Accordingly, in such a case, with the information processing device according to this embodiment, processing performed using faulty data is may be avoided. On the other hand, in the case where some intermediate packets are discarded, in a conventional method of transferring all the received packets if these packets may be transferred, without a comparison between the transmitting start time and the link-up time, the final packet would reach the server 102. For this reason, the server 102 would perform process using faulty data.

In FIG. 7, a link-down has occurred before the start of transmitting of packets, and thereafter a link-up has occurred before the switch 201 transfers packets. Specifically, a link-down occurs at a time t11. Thereafter, a link-up occurs at a time t12. During a period of time T2 between these times, it is impossible for the switch 201 to transfer packets to the switch 202. However, since the switch 201 does not transmit a packet in the meantime, no packet is discarded. Thereafter, the server 101 transmits the start packet at a time t13. That is, the time t13 will be the transmitting start time to be embedded in the final packet. Then, at and after the time t12, the switch 201 may transfer packets to the switch 202. At times t14 to t16, which is later than the time t12, the switch 201 outputs the packets 0 to 2 to the switch 202. Thereafter, the switch 201 compare the time t13, which is the transmitting start time stored in the final packet, with the time t12, which is the link-up time. Then, since the time t12 is earlier than the time t13, the switch 201 transfers the final packet to the switch 201 at a time t17. In this case, all the packets are transferred to the switch 202. Accordingly, in the information processing system according to this embodiment, as illustrated in FIG. 7, if a link-up has occurred before the start of transmitting of packets, the server 102 determines that communication has been completed. Thereafter, the server 102 performs processing using normal data.

In such a case as illustrated in FIG. 7, even when, as in a conventional way, all the received packets are transferred if these packets may be transferred, without a comparison between the transmitting start time and the link-up time, all the packets are transmitted to the switch 202 as in this embodiment and eventually all the packets reach the server 102. Accordingly, even in the conventional method, the server 102 determines that communication has been completed. Thereafter, the server 102 performs processing using normal data.

In FIG. 8, a link-down occurs during transmitting of packets, and thereafter a link-up occurs after a point of time at which the switch 201 transfers the final packet. Specifically, the server 101 transmits the start packet at a time t21.

That is, the time t21 will be the transmitting start time to be embedded in the final packet. Then, at and after the time t21 until a time t24, the switch 201 may transfer packets to the switch 202. Since the time t22 and the time t23 are positioned between the time t21 and the time t24, the switch 201 outputs the packet 0 and the packet 1 to the switch 202. Then, a link-down occurs at the time t24. Thereafter, a link-up occurs at a time t27. During a period of time T3 between these times, it is impossible for the switch 201 to transfer packets to the switch 202. For this reason, the switch 201 discards packets from the packet 2 to the final packet, which have been intended to be transferred from a time t25 to a time t26 in the period of time T3. Accordingly, the switch 201 does not transfer the packets from the packet 2 to the final packet to the switch 202. For this reason, the final packet does not reach the server 102. Accordingly, in the information processing system according to this embodiment, as illustrated in FIG. 8, if, in the switch 201, a link-down occurs during transmitting of packets and a link-up occurs after a point of time at which the final packet is transferred, the server 102 determines that communication will not be completed and transmitting of data has failed. Accordingly, the server 102 may avoid performing processing using faulty data.

In such a case as illustrated in FIG. 8, even when, as in the conventional way, all the received packets are transferred if these packets may be transferred, without a comparison between the transmitting start time and the link-up time, the final packet is discarded as in this embodiment and eventually does not reach the server 102. Then, the server 102 determines that communication will not be completed and transmitting of data has failed. Accordingly, the server 102 may avoid performing processing using faulty data.

Thus, in the cases of FIG. 7 and FIG. 8, using the information processing system according to this embodiment as well as using a method in which all the received packets are transferred if these packets may be transferred, without performing a comparison between the transmitting start time and the link-up time, the server 102 may avoid performing processing using faulty data.

In contrast to this, as illustrated in FIG. 6, if some of the packets other than the final packet are discarded because of a link-down, the server 102 may avoid performing processing using faulty data in the information processing system according to this embodiment. On the other hand, using a method in which all the received packets are transferred if these packets may be transferred, without performing a comparison between the transmitting start time and the link-up time, the server 102 would perform processing using faulty data.

Figure 9:
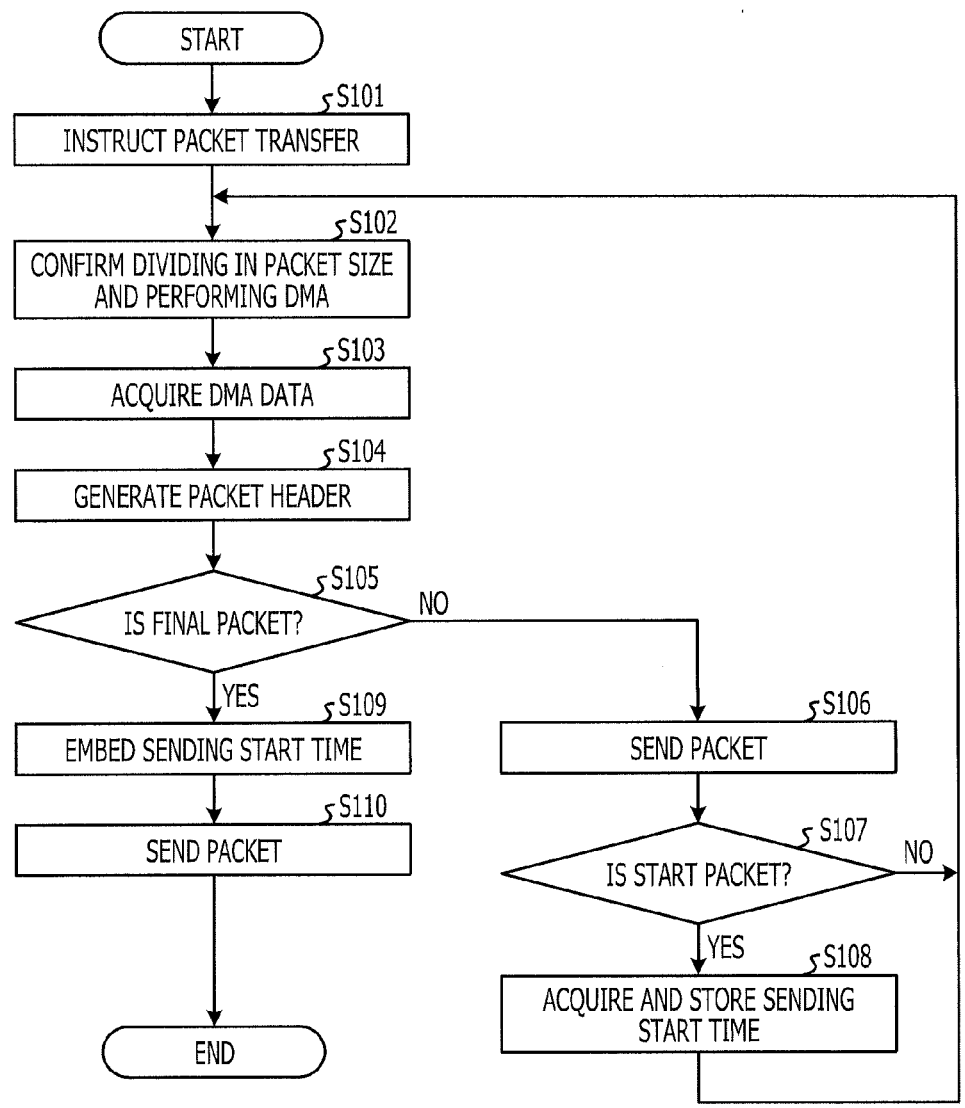
FIG. 9 is a flowchart of a process of transmitting a packet performed by a server.

With reference to FIG. 9, a process of transmitting a packet performed by the server 101 will be explained next. FIG. 9 is a flowchart of the process of transmitting a packet performed by a server.

The RDMA transmitting unit 115 receives an instruction for transfer of packets entered by the operator (step S101).

Then, from the received transfer instruction, the RDMA transmitting unit 115 confirms that data stored in the main storage unit 114 is to be divided into packets and direct memory access (DMA) is to be performed (step S102).

The RDMA transmitting unit 115 divides data stored in the main storage unit 114 into packets and acquires DMA data (step S103).

The RDMA transmitting unit 115 generates the packet header of the DMA data to be transmitted (step S104).

The RDMA transmitting unit 115 determines whether the DMA data that is going to be transmitted is the final packet (step S105). If the data is not the final packet (No at step S105), the RDMA transmitting unit 115 adds the generated packet header to the acquired DMA data and then transmits the packet to the switch 201 (step S106).

Then, the RDMA transmitting unit 115 determines whether the transmitted packet is the start packet (step S107). If the transmitted packet is the start packet (Yes at step S107), the RDMA transmitting unit 115 notifies the time embedding unit 112 of transmitting of the start packet. The time embedding unit 112 acquires the transmitting start time from the clock 111, and stores the acquired the transmitting start time in the transmitting start time register 113 (step S108). Thereafter, the RDMA transmitting unit 115 returns to the operation at step S102.

In contrast, if the transmitted packet is not the start packet (No at step S107), the RDMA transmitting unit 115 returns to the operation at step S102.

On the other hand, if the acquired DMA data is the final packet (Yes at step S105), the time embedding unit 112 embeds the transmitting start time in the packet header generated by the RDMA transmitting unit 115 (step S109).

Then, the RDMA transmitting unit 115 adds the packet header, in which the transmitting start time is embedded, to the DMA data, and then transmits the packet (step S110).

Figure 10:
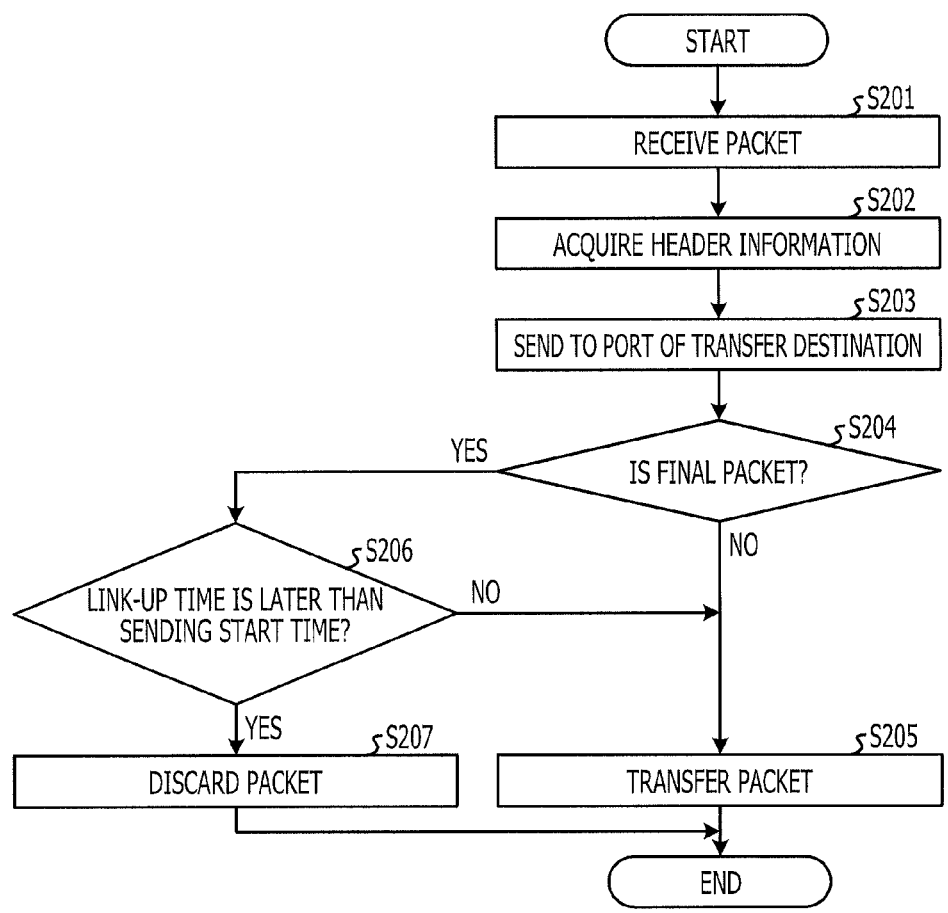
FIG. 10 is a flowchart of a process of transferring a packet performed by a switch.

With reference to FIG. 10, a process of transferring a packet performed by the switch 201 will be explained next. FIG. 10 is a flowchart of the process of transferring a packet performed by a switch. With reference to the flowchart of FIG. 10, the case where a link-up time is already stored in the link-up time register 216 will be explained. The flowchart of FIG. 10 illustrates the flow of the process for one packet, and, in reality, the process illustrated in the flowchart of FIG. 10 is applied to all the packets transmitted through RDMA.

The receiving unit 213 receives a packet from the server 101 (step S201).

The receiving unit 213 acquires header information from the received packet (step S202). In addition, the receiving unit 213 transmits the acquired header information to the transmitting completion inhibiting unit 215.

The receiving unit 213 transmits the packet to the port of a transfer destination to which the transmitting destination stored in the header information is coupled (step S203). From the receiving unit 213, the transfer unit 214 receives the packet to be transferred.

The transmitting completion inhibiting unit 215 determines, from the received header information of the packet, whether the packet to be transferred is the final packet (step S204). If the packet is not the final packet (No at step S204), the transfer unit 214 transfers the packet (step S205).

In contrast, if the packet to be transferred is the final packet (Yes at step S204), the transmitting completion inhibiting unit 215 acquires the transmitting start time embedded in the final packet. In addition, the transmitting completion inhibiting unit 215 acquires a link-up time from the link-up time register 216. Then, the transmitting completion inhibiting unit 215 determines whether the link-up time is later than the transmitting start time (step S206). If the link-up time is equal to or earlier than the transmitting start time (No at step S206), the transfer unit 214 proceeds to the operation at step S205, where the transfer unit 214 transfers the packet.

In contrast, if the link-up time is later than the transmitting start time (Yes at step S206), the transmitting completion inhibiting unit 215 instructs the transfer unit 214 to discard the packet. Then, the transfer unit 214 discards the packet that is going to be transferred and that is the final packet (step S207).

Figure 11:
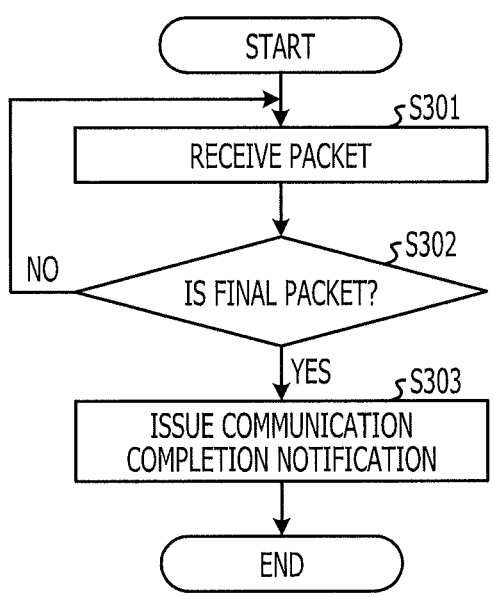
FIG. 11 is a flowchart of the process of receiving a packet performed by a server.

With reference to FIG. 11, a process of receiving a packet performed by the server 102 will be explained next. FIG. 11 is a flowchart of the process of receiving a packet performed by a server.

The RDMA receiving unit 122 receives a packet from the switch 203 (step S301).

Then, the RDMA receiving unit 122 determines whether the packed is the final packet (step S302). If the packet is not the final packet (No at step S302), the RDMA receiving unit 122 returns to the operation at step S301.

In contrast, if the packet is the final packet (Yes at step S302), the RDMA receiving unit 122 issues a notification of the completion of communication (step S303) and writes data in the main storage unit 121.

As explained above, when performing RDMA, the information processing system according to this embodiment discards the final packet if discard of a packet because of a link-down, that is, a packet lose has occurred, so that the final packet will not reach a server on the receiving side. As a result, when a packet loss has occurred, it is impossible for the server on the receiving side to confirm the completion of communication, and therefore the server on the receiving side will determine that the data transfer of RDMA has failed. Thus, the effects that the server on the receiving side may avoid performing processing using broken data, and that generation of a fault arising from a packet loss caused by a link-down may be avoided are obtained.

Additionally, in the information processing system according to this embodiment, the transmitting start time is embedded in the final packet, and, on the basis of a comparison between the transmitting start time and the link-up time, it may be determined whether a packet loss has occurred. Thus, the functions mentioned above may be achieved with a simple configuration.

(First Modification)

A first modification of the first embodiment will be explained next. Although the switch discards the final packet if a packet loss has occurred in the first embodiment described above, the switch in this modification notifies a server on the receiving side (hereinafter abbreviated as a "receiving-side server") of an error. Accordingly, the notification of an error performed by the switch and the operations of the server that has received the error notification will be mainly explained below.

The transmitting completion inhibiting unit 215 identifies the final packet from the header information of a packet received from the receiving unit 213. Then, the transmitting completion inhibiting unit 215 acquires the transmitting start time from the final packet, and compares the acquired transmitting start time with the link-up time stored in the link-up time register 216.

If the link-up time is later than the transmitting start time, the transmitting completion inhibiting unit 215 embeds an error flag in the header of the final packet. For example, the transmitting completion inhibiting unit 215 embeds an error flag by setting the bit at a predetermined position in the header of the final packet to a value (for example, "1") representing an error.

The transfer unit 214 transfers, to the switch 202, the final packet having the header in which the error flag is embedded.

The RDMA receiving unit 122 of the server 102 receives the final packet having the header in which the error flag is embedded. Then, the RDMA receiving unit 122 checks the error flag of the header of the final packet, and verifies the occurrence of an error, that is, the occurrence of a packet loss. Then, the RDMA receiving unit 122 does not carry out notification of completion of communication and notifies higher-level software, which uses data transferred through RDMA, of the occurrence of the error. Thereby, the higher-level software notified of the occurrence of the error avoids performing processing in which the data transferred through RDMA is used.

As explained above, in the information processing system according to this modification, if a packet loss due to a link-down has occurred, the receiving-side server receives the final packet in which an error flag is embedded. Thereby, the receiving-side server may grasp the occurrence of a packet loss, and may avoid generation of a fault arising from the packet loss caused by the link-down.

(Second Modification)

In addition, a second modification, which is another modification of the first embodiment, will be explained. In the first embodiment described above, the switch discards the final packet if the link-up time is later than the transmitting start time. In contrast to this, the switch of this modification determines, under the condition where the clock error is included, whether a packet loss has occurred. Accordingly, the processing of a packet loss determination performed by the switch will be mainly explained below.

In the transmitting completion inhibiting unit 215, a maximum period of time of error that occurs between the clock 111 and the clock 211 respectively included in the server 101 and each of the switches 201 to 203 is stored in advance. One second, for example, is stored as a maximum period of time of error in the case of using an NTP and so on is stored in the transmitting completion inhibiting unit 215.

The transmitting completion inhibiting unit 215 identifies the final packet from the header information of a packet received from the receiving unit 213. Then, the transmitting completion inhibiting unit 215 acquires a link-up time stored in the link-up time register 216, and then adds the maximum period of time of error to the link-up time.

Then, the transmitting completion inhibiting unit 215 acquires the transmitting start time from the final packet, and compares the transmitting start time with a time obtained by adding the maximum period of time of error to the link-up time.

If the time obtained by adding the maximum period of time of error to the link-up time is later than the transmitting start time, the transmitting completion inhibiting unit 215 notifies the transfer unit 214 to discard the final packet.

In this way, by including the maximum period of time of error for a determination on the occurrence of a packet loss, the occurrence of a packet loss may be detected with more reliability, and the generation of a fault arising from a packet loss caused by a link-down may be avoided.

[Second Embodiment]

Figure 12:
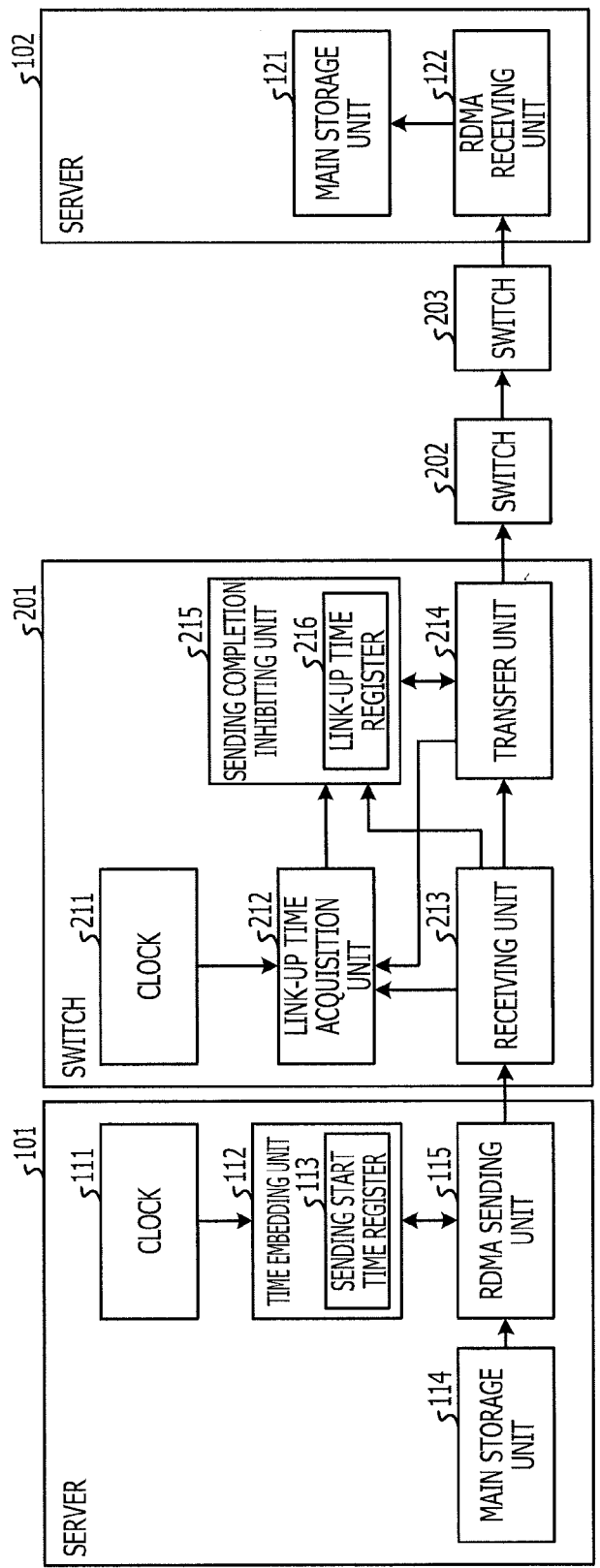
FIG. 12 is a block diagram of an information processing system according to a second embodiment.

FIG. 12 is a block diagram of an information processing system according to a second embodiment. The information processing system according to this embodiment differs from the first embodiment in that the occurrence of a link-up after a link-down is also detected on the receiving side of a switch, and the link-up time is compared with the transmitting start time. In FIG. 12, units having the same reference numerals as those in FIG. 2 have the same functions unless particularly explained.

As in the first embodiment, the link-up time acquisition unit 212 monitors the coupling state between the switch 201 and the switch 202 by monitoring output and so on of the transfer unit 214, and detects the occurrence of a link-up.

In this embodiment, furthermore, the link-up time acquisition unit 212 monitors the coupling state between the server 101 and the switch 201 by monitoring the state of receiving a packet in the receiving unit 213, and so on. For example, the link-up time acquisition unit 212 determines that a link-down has occurred, if receipt of a packet in the receiving unit 213 has been stopped for a predetermined period of time. Then, if receipt of a packet in the receiving unit 213 is resumed after it is determined that a link-down has occurred, the link-up time acquisition unit 212 determines that a link-up has occurred. Hereinafter, the link-up and the link-down of coupling between the server 101 and the switch 201 are referred to as a "receiving-side link-up" and a "receiving-side link-down". Additionally, the link-up and the link-down of coupling between the switch 201 and the switch 202 are referred to as a "transfer-side link-up" and a "transfer-side link-down".

Upon determining that a transfer-side link-up has occurred, the link-up time acquisition unit 212 acquires a time from the clock 211. Hereinafter, the time at which a transfer-side link-up occurs and that is acquired by the link-up time acquisition unit 212 is referred to as a "transfer-side link-up time". The link-up time acquisition unit 212 outputs the acquired transfer-side link-up time to the transmitting completion inhibiting unit 215.

Upon determining that a receiving-side link-up has occurred, the link-up time acquisition unit 212 acquires a time from the clock 211. Hereinafter, the time at which a receiving-side link-up occurs and that is acquired by the link-up time acquisition unit 212 is referred to as a "receiving-side link-up time". The link-up time acquisition unit 212 outputs the acquired receiving-side link-up time to the transmitting completion inhibiting unit 215.

The transmitting completion inhibiting unit 215 has a link-up time register 216, which is a storage device. When a transfer-side link-up occurs, the transmitting completion inhibiting unit 215 receives a transfer-side link-up time from the link-up time acquisition unit 212. Then, the transmitting completion inhibiting unit 215 stores the received transfer-side link-up time in the link-up time register 216. If a transfer-side link-up time is already stored in the link-up time register 216, the transmitting completion inhibiting unit 215 updates the transfer-side link-up time stored in the link-up time register 216 by replacing it with a newly acquired transfer-side link-up time.

When a receiving-side link-up occurs, the transmitting completion inhibiting unit 215 receives a receiving-side link-up time from the link-up time acquisition unit 212. Then, the transmitting completion inhibiting unit 215 stores the received receiving-side link-up time in the link-up time register 216. If a receiving-side link-up time is already stored in the link-up time register 216, the transmitting completion inhibiting unit 215 updates the receiving-side link-up time stored in the link-up time register 216 by replacing it with a newly acquired receiving-side link-up time.

That is, the transmitting completion inhibiting unit 215 holds the latest transfer-side link-up time and receiving-side link-up time in the link-up time register 216 at all times.

Additionally, referring to the header information of a packet acquired from the receiving unit 213, the transmitting completion inhibiting unit 215 determines whether the packet received by the receiving unit 213 and transmitted to the transfer unit 214 is the final packet.

If the packet is the final packet, the transmitting completion inhibiting unit 215 compares a transfer-side link-up time and a receiving-side link-up time stored in the link-up time register 216 with the transmitting start time stored in the final packet. If either the transfer-side link-up time or the receiving-side link-up time is later than the transmitting start time, the transmitting completion inhibiting unit 215 instructs the transfer unit 214 to discard the final packet.

If the transfer unit 214 receives the final packet from the receiving unit 213, the transfer unit 214 checks whether there is an instruction from the transmitting completion inhibiting unit 215 requesting for discard of the final packet. If there is an instruction requesting for discard of the final packet, the transfer unit 214 discards the final packet and does not output the final packet to the switch 202.

Although the above explanation has been given on the switch 201, other switches such as the switch 202 and the switch 203 according to this embodiment have the same functions as the switch 201.

Here, although the occurrence of a link-down of the coupling between the server 101 and the switch 201 is not grasped by using the method of the first embodiment, the link-down of all of the coupling between the server 101 and the server 102 may be detected in the information processing system of this embodiment.

As explained above, the switch according to this embodiment monitors the coupling states of both of the coupling of the receiving side and the coupling of the transfer side, and detects the occurrence of a link-up in coupling of each of both sides. Then, the switch according to this embodiment determines that a packet loss has occurred, if the time at which a link-up has occurred in either coupling is later than the transmitting start time, and discards the final packet. Thereby, on either of the receiving side and the transmitting side of the switch, it may be detected that a packet loss caused by a link-down has occurred. Accordingly, the server on the receiving side may avoid performing processing using data that has become faulty because of a packet loss, with more reliability.

[Third Embodiment]

Figure 13:
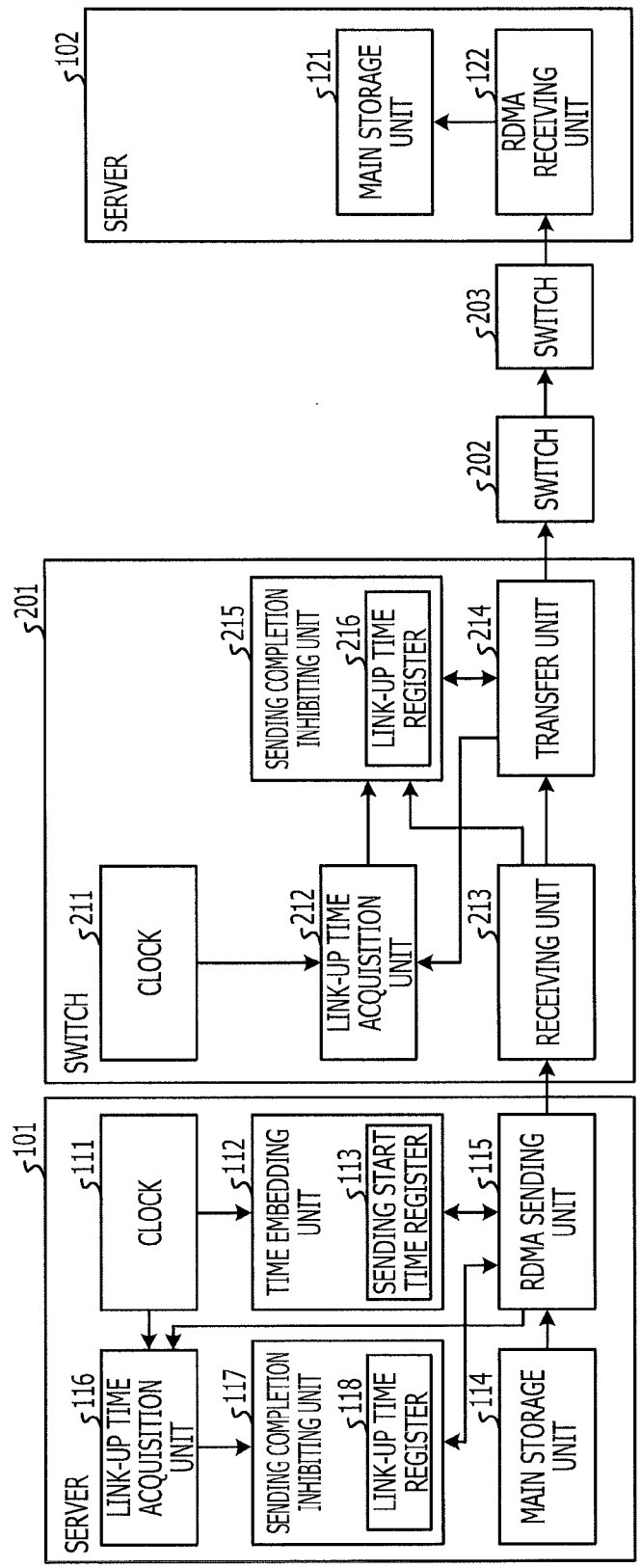
FIG. 13 is a block diagram of an information processing system according to a third embodiment.

FIG. 13 is a block diagram of an information processing system according to a third embodiment. The information processing system according to this embodiment differs from the first embodiment in that, also on the transmitting side of a server, the occurrence of a link-up after a link-down is detected, and the link-up time is compared with the transmitting start time. In FIG. 13, units having the same reference numerals as those in FIG. 2 have the same functions unless particularly explained.

In this embodiment, in addition to the configuration of the first embodiment, the server 101 has a transmitting completion inhibiting unit 117 and a link-up time acquisition unit 116.

The link-up time acquisition unit 116 monitors the coupling state between the server 101 and the switch 201 by monitoring the packet transmitting state in the transfer unit 214. For example, the link-up time acquisition unit 116 determines that a link-down has occurred, if packet transmitting from the RDMA transmitting unit 115 has been stopped for a predetermined period of time. Then, after determining that a link-down has occurred, the transfer unit 214 determines that a link-up has occurred, if the packet transmitting from the RDMA transmitting unit 115 is resumed. Hereinafter, the link-up and the link-down of coupling between the server 101 and the switch 201 are referred to simply as a "link-up" and a "link-down".

Upon determining that a link-up has occurred, the link-up time acquisition unit 116 acquires a time from the clock 111. Hereinafter, the time acquired by the link-up time acquisition unit 116 is referred to as a "link-up time". The link-up time acquisition unit 116 outputs the acquired link-up time to the transmitting completion inhibiting unit 117.

The transmitting completion inhibiting unit 117 has a link-up time register 118, which is a storage device. When a link-up has occurred, the transmitting completion inhibiting unit 117 receives a link-up time from the link-up time acquisition unit 116. Then, the transmitting completion inhibiting unit 117 stores the received link-up time in the link-up time register 118. If a link-up time is already stored in the link-up time register 118, the transmitting completion inhibiting unit 117 updates the link-up time stored in the link-up time register 118 by replacing it with a newly acquired link-up time. That is, the transmitting completion inhibiting unit 117 holds the latest link-up time in the link-up time register 118 at all times.

Additionally, referring to the header information of a packet to be transmitted by the RDMA transmitting unit 115, the transmitting completion inhibiting unit 117 determines whether the packet to be transmitted by the RDMA transmitting unit 115 is the final packet.

If the packet is the final packet, the transmitting completion inhibiting unit 117 compares the link-up time stored in the link-up time register 118 with the transmitting start time stored in the final packet. If the link-up time is later than the transmitting start time, the transmitting completion inhibiting unit 117 instructs the RDMA transmitting unit 115 to discard the final packet.

Here, although the same operations as the transmitting completion inhibiting unit 215 of the switch 201 are performed by the transmitting completion inhibiting unit 117 in this embodiment, other methods may be used as the method of comparing the transmitting start time with the link-up time. For example, the transmitting completion inhibiting unit 117 may check a transmitting start time stored in the transmitting start time register 113 at a point of time at which a link-up time is acquired, and may compare the transmitting start time with the link-up time. Also in this case, if the link-up time is later than the transmitting start time, the transmitting completion inhibiting unit 117 may instruct the RDMA transmitting unit 115 to discard the final packet.

When transmitting the final packet, the RDMA transmitting unit 115 checks whether there is an instruction from the transmitting completion inhibiting unit 117 requesting for discard of the final packet. If there is an instruction requesting for discard of the final packet, the RDMA transmitting unit 115 discards the final packet and does not output the final packet to the switch 201.

Here, although the occurrence of a link-down of the coupling between the server 101 and the switch 201 is not grasped by using the method of the first embodiment, the link-down of all of the coupling between the server 101 and the server 102 may be detected in the information processing system of this embodiment.

As explained above, the information processing device according to this embodiment also detects the occurrence of a link-up in a server on the transmitting side. Then, the server on the transmitting side according to this embodiment determines that a packet loss has occurred, if the time at which a link-up has occurred in any coupling is later than the transmitting start time, and discards the final packet. Thereby, it may be detected in a server on the transmitting side that a packet loss caused by a link-down has occurred.

Accordingly, the server on the receiving side may avoid performing processing using data that has become faulty because of a packet loss, with more reliability.

Furthermore, although the functions of detecting the occurrence of a link-up and discarding the final packet are provided only in a server on the transmitting side, the same functions as in this embodiment may be provided in a server on the receiving side. For example, in a server on the receiving side, the link-up of coupling on the packet receiving side may be detected, and a packet loss may be detected by comparing the transmitting start time stored in the received final packet with the link-up time. For example, the functions of detecting the occurrence of a link-up and discarding the final packet are provided in the receiving side of a switch and a server on the receiving side, so that the link-down of all of the coupling between the server on the transmitting side and the server on the receiving side may be detected.

[Fourth Embodiment]

An information processing system according to a fourth embodiment will be explained next. The information processing system according to this embodiment differs from the first embodiment in that the transmitting start time is also embedded in intermediate packets, and the occurrence of a packet loss is detected using not only the final packet but also the intermediate packets. The information processing system according to this embodiment is also illustrated in the block diagram of FIG. 2.

The operations on the side of the server 101 will be explained. The time embedding unit 112 receives a notification of transmitting of the start packet from the RDMA transmitting unit 115. The time embedding unit 112 acquires a time at which the notification of transmitting of the start packet has been received, from the clock 111. Hereinafter, the time acquired by the time embedding unit 112 is referred to as the "transmitting start time". The time embedding unit 112 stores the transmitting start time in the transmitting start time register 113.

Then, the time embedding unit 112 acquires a packet that the RDMA transmitting unit 115 intends to transmit, from the RDMA transmitting unit 115, and embeds the transmitting start time, which has been stored in the transmitting start time register 113, in the header of the acquired packet. Here, since the transmitting start time is acquired at a point of time at which the start packet is transmitted, the transmitting start time will be embedded in intermediate packets and the final packet. Then, the time embedding unit 112 transmits the packet having the head in which the transmitting start time is embedded, to the RDMA transmitting unit 115.

The RDMA transmitting unit 115 transmits the start packet in its original state to the switch 201. Then, for intermediate packets and the final packet, the RDMA transmitting unit 115 receives the packets in which the transmitting start time is embedded, from the time embedding unit 112. Then, the RDMA transmitting unit 115 sequentially transmits the intermediate packets and the final packet in which the transmitting start time is embedded, to the switch 201.

The operations of the switch 201 will be explained next. The transmitting completion inhibiting unit 215 receives a link-up time from the link-up time acquisition unit 212. Then, the transmitting completion inhibiting unit 215 stores the received link-up time in the link-up time register 216. If a link-up time is already stored in the link-up time register 216, the transmitting completion inhibiting unit 215 updates the link-up time stored in the link-up time register 216 by replacing it with a newly acquired link-up time. That is, the transmitting completion inhibiting unit 215 holds the latest link-up time in the link-up time register 216 at all times.

Additionally, the transmitting completion inhibiting unit 215 sequentially acquires the headers of the start packet, intermediate packets, and final packet from the receiving unit 213. Then, referring to the header, the transmitting completion inhibiting unit 215 determines whether or not a packet received by the receiving unit 213 and transmitted to the transfer unit 214 is either of an intermediate packet and the final packet.

If the packet is either of an intermediate packet and the final packet, the transmitting completion inhibiting unit 215 compares a link-up time stored in the link-up time register 216 with the transmitting start time stored in the packet that the transfer unit 214 intends to transfer. If the link-up time is later than the transmitting start time, the transmitting completion inhibiting unit 215 embeds an error flag in the header of the packet that the transfer unit 214 intends to transfer.

The transfer unit 214 sequentially receives the start packet, intermediate packets, and the final packet from the receiving unit 213. Then, the transfer unit 214 sequentially outputs the received start packet and intermediate packets to the switch 202. Then, if an error flag has been embedded by the transmitting completion inhibiting unit 215, the transfer unit 214 outputs the packet with the embedded error flag to the switch 202. Additionally, if an error flag has not been embedded by the transmitting completion inhibiting unit 215, the transfer unit 214 outputs the packet in which the error flag is not embedded to the switch 202.

As explained above, in the information processing device according to this embodiment, the server on the transmitting side embeds the transmitting start time in the intermediate packets and the final packet, and the switch notifies the receiving-side server of an error if the link-up time is later than the transmitting start time embedded. Thereby, immediately after the occurrence of a packet loss caused by a link-down, the receiving-side server may be notified of a packet loss. Thus, the occurrence of an error may be detected quickly.

Then, for example, when the server on the receiving side receives the occurrence of an error, the server on the receiving side notifies the server on the transmitting side and each switch of the cancellation of transfer, so that needless data transfer may be omitted, and the processing load of the information processing system, and the load of a network may be lessened.

Figure 14:
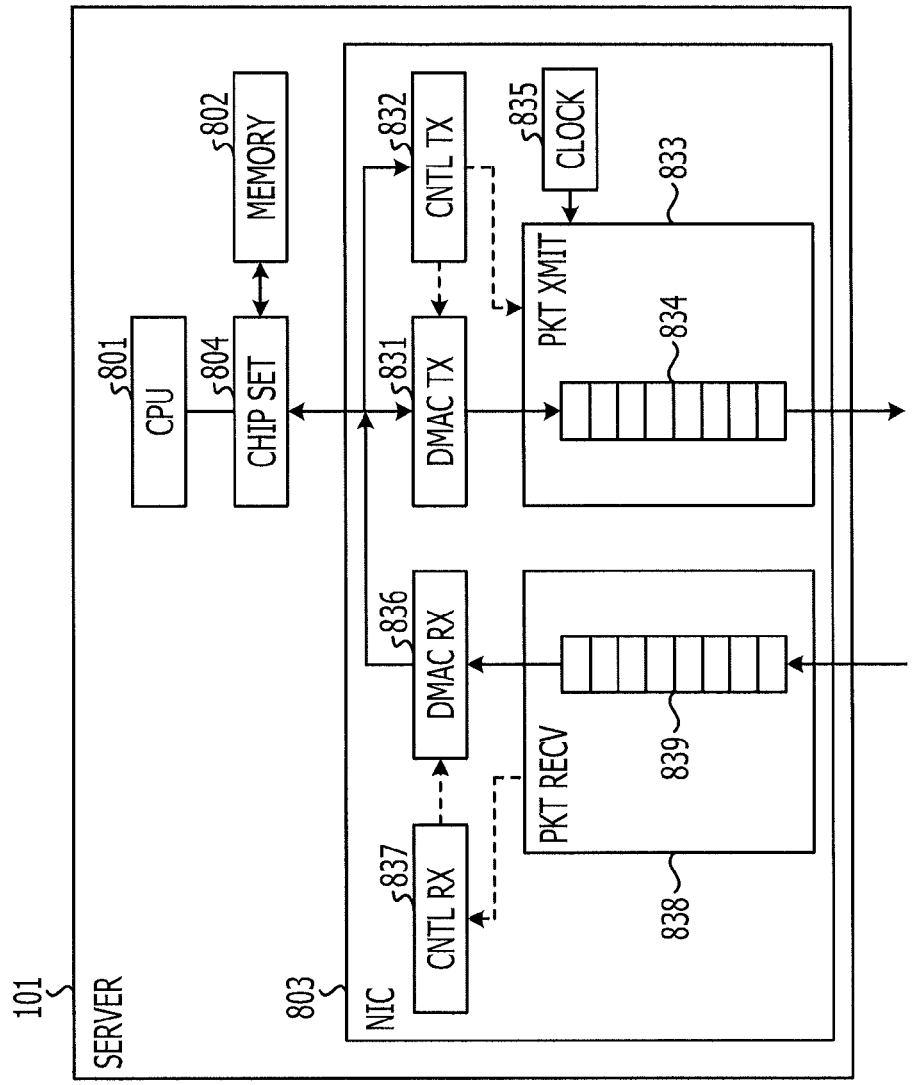
FIG. 14 is a hardware configuration diagram of a server.
Figure 15:
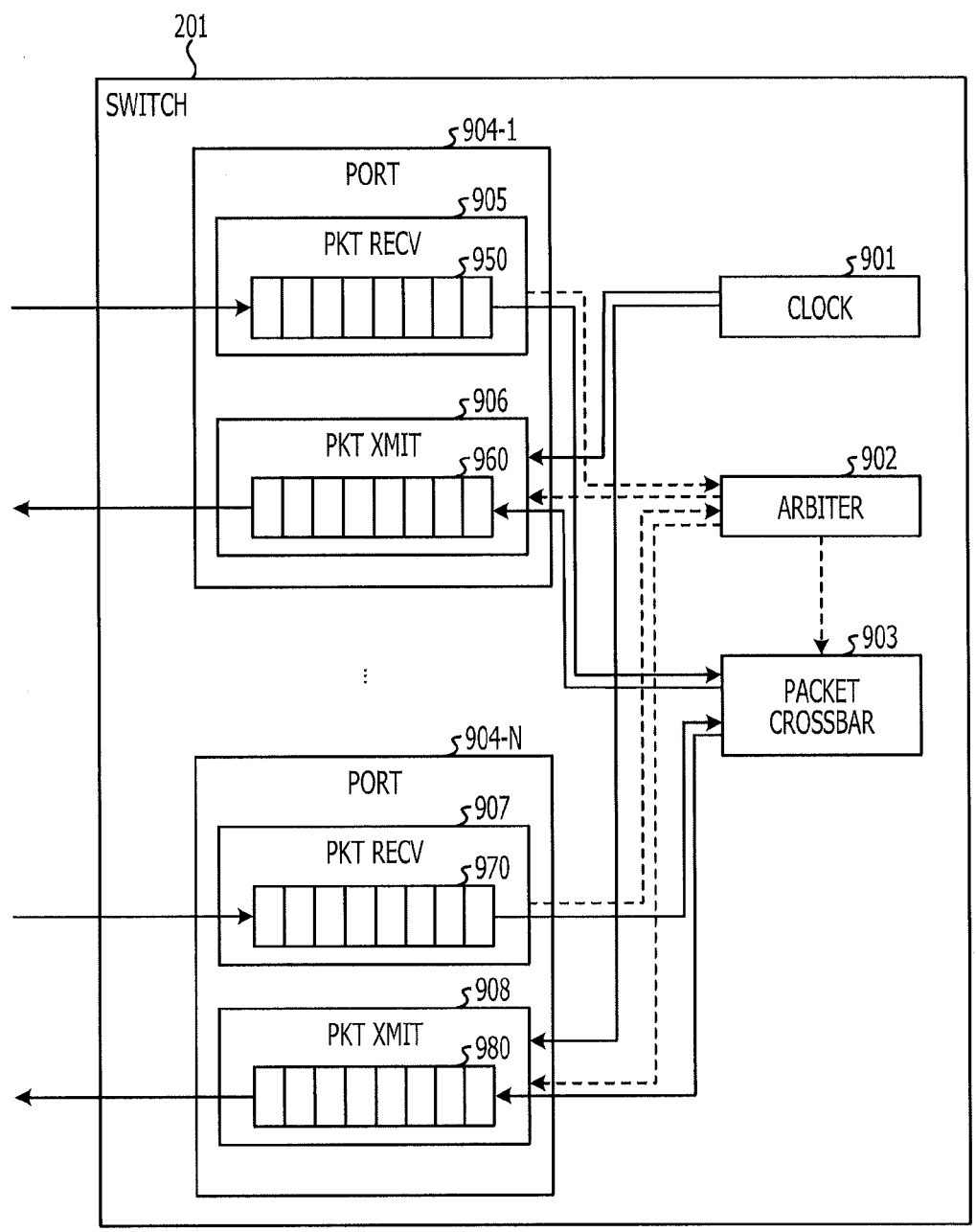
FIG. 15 is a hardware configuration diagram of a switch.

With reference to FIG. 14 and FIG. 15, the hardware configurations of the server 101 and the switch 201 according to each embodiment will be explained next. FIG. 14 is a hardware configuration diagram of a server. FIG. 15 is a hardware configuration diagram of a switch. The broken lines in FIG. 14 and FIG. 15 indicate the paths of control signals, and the solid lines indicate the paths of data such as packets.

As illustrated in FIG. 14, the server 101 includes a central processing unit (CPU) 801, a memory 802, a network interface card (NIC) 803, and a chip set 804.

The CPU 801 is an arithmetic processing unit. The memory implements the main storage unit 114. The CPU 801, the memory 802, the NIC 803, and the chip set 804 are coupled though a bus.

The NIC 803 includes direct memory access controller (DMAC) TX 831, which is a transmitting DMAC, a CNTL TX 832, which is a transmitting control device, a PKT XMIT 833, which is a packet transmitting device, and a packet buffer 834. Additionally, the NIC 803 includes a DMAC RX 836, which is a receiving DMAC, a CNTL RX 837, which is a receiving control device, a PKT RECV 838, which is a packet receiving device, and a packet buffer 839. Furthermore, the NIC 803 has a clock 835.

The DMAC TX 831 controls data transmission by direct memory access. The CNTL TX 832 performs centralized control over data transmission. For example, the CNTL TX 832 provides an instruction for data transfer by DMAC, and so on to the DMAC TX 831. Additionally, the CNTL TX 832 provides instructions for transmitting a packet, acquiring and embedding the transmitting start time, and so on to the PKT XMIT 833. The PKT XMIT 833 accumulates packets received from the DMAC TX 831 in the packet buffer 834, and transmits the accumulated packets. Additionally, the PKT XMIT 833 embeds the transmitting start time acquired from the clock 835 in a packet.

The clock 835 implements the function of the clock 111, for example. The DMAC TX 831 and the PKT XMIT 833 implement the functions of the RDMA transmitting unit 115 and the time embedding unit 112, for example.

The DMAC RX 836 performs control over data reception by direct memory access. The CNTL RX 837 performs centralized control over data reception. For example, the CNTL RX 837 provides an instruction for data reception by DMAC, and so on to the DMAC RX 836. Additionally, the CNTL RX 837 provides instructions for transmitting a packet, acquiring and embedding the transmitting start time, and so on to the PKT RECV 838. The PKT RECV 838 accumulates the received packets in the packet buffer 839, and outputs the accumulated packets to the DMAC RX 836.

The server 102 also has the same configuration as the server 101 of FIG. 14, and the DMAC RX 836, the CNTL RX 837, the PKT RECV 838, and the packet buffer 839 implement the function of the RDMA receiving unit 122, for example. In this case, the memory 802 implements the function of the main storage unit 121, for example.

Then, as illustrated in FIG. 15, for example, the switch 201 has N ports from a port 904-1 to a port 904-N. Furthermore, the switch 201 includes a clock 901, an arbiter 902, and a packet crossbar 903.

The port 904-1 has a PKT RECV 905, which is a packet receiving device, and a PKT XMIT 906, which is a packet transmitting device. The PKT RECV 905 has a packet buffer 950. The PKT XMIT 906 has a packet buffer 960. The port 904-N has a PKT RECV 907 and a PKT XMIT 908. The PKT RECV 907 has a packet buffer 970. The PKT XMIT 908 has a packet buffer 980. Here, other ports have the same configuration as mentions above.

The clock 901 implements the function of the clock 211, for example.

The arbiter 902 performs centralized control over packet transfer. For example, the arbiter 902 performs output arbitration, such as calculation of the input-and-output configuration of packets. Additionally, the arbiter 902 checks the header information of packets received by the PKT RECV 905 and the like, and instructs the packet crossbar 903, the PKT XMIT 908, and so on to perform transfer.

The packet crossbar 903 performs coupling switchover among the port 904-1 to the port 904-N. For example, the packet crossbar 903 couples the port 904-1 to which packets are input and the port 904-N to which the packets are to be transferred, thereby causing the packets input to the port 904-1 to be transferred to the port 904-N.

The PKT RECV 905 receives the input packets and accumulates the received packets in the packet buffer 950, and transfers the packets accumulated in the packet buffer 950 to a port to which the port 904-1 has been coupled by the packet crossbar 903 and to which the packets are to be transferred. The PKT RECV 907 and the like operate in the same way as the PKT RECV 905.

The PKT XMIT 906 accumulates packets transferred from other ports in the packet buffer 960, and outputs the accumulated packets to a device, such as the switch 202, to which this port has been coupled by the packet crossbar 903. Additionally, the PKT XMIT 906 acquires a link-up time from the clock 901, compares the transmitting start time with the link-up time, and discards a packet. The PKT XMIT 908 and the like operate in the same way as the PKT XMIT 906.

The arbiter 902, the packet crossbar 903, and the port 904-1 to the port 904-N implement the functions of the link-up time acquisition unit 212, the receiving unit 213, the transfer unit 214, and the transmitting completion inhibiting unit 215, for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A processing system, comprising:
a first processing device;
a switch device coupled to the first processing device; and
a second processing device coupled to the switch device,
wherein the first processing device is configured to:
divide data into a plurality of packets,
transmit a start packet indicating a first packet among the plurality of packets to the switch device,
acquire a transmitting start time indicating a time when the start packet was transmitted from the first processing device,
transmit one or more intermediate packets among the plurality of packets to the switch device, according to an order of the one or more intermediate packets, and
transmit a final packet indicating a last packet among the plurality of packets to the switch device, the final packet having information of the transmitting start time of the start packet,
wherein the switch device is configured to:
transfer the start packet and the one or more intermediate packets to the second processing device,
extract the transmitting start time from the final packet when the final packet is received,
acquire a link-up time indicating a time when a final link-up occurred between the first processing device and the second processing device, based on a timing of receiving or transferring of the start packet and the one or more intermediate packets, and
suppress performing a process using the plurality of packets to be executed by the second processing device, when the acquired link-up time is later than the extracted transmitting start time.

2. The processing system according to claim 1, wherein the switch device is configured to discard the received final packet when the acquired link-up time is later than the extracted transmitting start time.

3. The processing system according to claim 1, wherein the switch device is configured to add an error flag for suppressing performing the process to the received final packet and transmit the final packet to the second processing device.

4. The processing system according to claim 1, wherein the first processing device includes a controller configured to add the information of the transmitting start time to the final packet.

5. The processing system according to claim 1, wherein the switch device is configured to detect an occurrence of the link-up by monitoring one of a state of a receiver of the switch device and a state of a transmitter of the switch device.

6. The processing system according to claim 1, wherein when the switch device detects a plurality of times of the link-up, the switch device holds a time of a link-up that has subsequently occurred, as the link-up time.

7. The processing system according to claim 1, wherein the switch device is configured to hold first period information indicating a first period of time, and control the second processing device so that the second processing device does not perform the process when a difference between the transmitting start time and the link-up time is shorter than the first period of time even when the second link-up time is earlier than the transmitting start time.

8. A switch device that relays a plurality of packets acquired by dividing data, the plurality of packets being transmitted from a first processing device to a second processing device, the switch device comprising:
a memory, and
a processor coupled to the memory and configured to
receive a start packet indicating a first packet among the plurality of packets and one or more intermediate packets among the plurality of packets from the first processing device,
transfer the start packet and the one or more intermediate packets to the second processing device,
receive a final packet indicating a last packet among the plurality of packets from the first processing device, the final packet having information of a transmitting start time indicating a time when the start packet was transmitted from the first processing device,
extract the transmitting start time from the received final packet,
acquire a link-up time indicating a time when a final link-up occurred between the first processing device and the second processing device, based on a timing of receiving or transferring of the start packet and the one or more intermediate packets, and
suppress performing a process using the plurality of packets to be executed by the second processing device, when the acquired link-up time is later than the extracted transmitting start time.

9. The switch device according to claim 8, wherein the processor is configured to discard the received final packet when the acquired link-up time is later than the extracted transmitting start time.

10. The switch device according to claim 8, wherein the processor is configured to add an error flag to prohibit performing the process to the received final packet and transmit the final packet to the second processing device.

11. A data transmitting method executed by a processing system including a first processing device, a switch device coupled to the first processing device, and a second processing device coupled to the switch device, the data transmitting method comprising:

dividing, by the first processing device, data into a plurality of packets, transmitting a start packet indicating a first packet among the plurality of packets to the switch device, acquiring a transmitting start time indicating a time when the start packet was transmitted from the first processing device, transmitting one or more intermediate packets among the plurality of packets to the switch device, according to an order of the one or more intermediate packets, and transmitting a final packet indicating a last packet among the plurality of packets to the switch device, the final packet having information of the transmitting start time of the start packet, transferring, by the switch device, the start packet and the one or more intermediate packets to the second processing device, extracting the transmitting start time from the final packet when the final packet is received, acquiring a link-up time indicating a time when a final link-up occurred between the first processing device and the second processing device, based on a timing of receiving or transferring of the start packet and the one or more intermediate packets, and suppressing performing a process using the plurality of packets to be executed by the second processing device, when the acquired link-up time is later than the extracted transmitting start time.

12. The data transmitting method according to claim 11, comprising:

discarding the received final packet when the acquired link-up time is later than the extracted transmitting start time.

13. The data transmitting method according to claim 11, wherein adding an error flag to prohibit performing the process to the received final packet, and transmitting the final packet to the second processing device.

14. The data transmitting method according to claim 11, further comprising adding, by the first processing device, the information of the transmitting start time of the start packet to the final packet.

* * * * *